United States Patent [19]

Wight

[11] Patent Number: 4,908,705
[45] Date of Patent: Mar. 13, 1990

[54] STEERABLE WIDE-ANGLE IMAGING SYSTEM

[75] Inventor: Ralph Wight, Northport, N.Y.

[73] Assignee: Fairchild Weston Systems, Inc., Syosset, N.Y.

[21] Appl. No.: 146,696

[22] Filed: Jan. 21, 1988

[51] Int. Cl.$^4$ .............................................. H04N 7/18
[52] U.S. Cl. .................................... 358/109; 358/225; 358/88
[58] Field of Search ................. 358/109, 113, 225, 88, 358/87, 229; 250/578, 239

[56] References Cited

U.S. PATENT DOCUMENTS

| | | |
|---|---|---|
| 2,599,517 | 6/1952 | Raspet . |
| 2,966,096 | 12/1960 | D'Incerti et al. . |
| 3,278,252 | 10/1966 | Brixner ............................ 358/225 X |
| 3,294,903 | 12/1966 | Goldmark et al. ................. 358/109 |
| 3,532,039 | 9/1970 | Rising . |
| 3,620,148 | 9/1969 | Rocco et al. . |
| 3,640,199 | 2/1972 | Wolf . |
| 4,051,523 | 9/1977 | Laikin et al. ..................... 358/225 X |
| 4,229,762 | 10/1980 | Healy .............................. 358/225 X |
| 4,234,241 | 11/1980 | Schmidt ........................... 358/109 X |
| 4,613,899 | 9/1986 | Kuwano et al. .................. 358/109 X |
| 4,661,855 | 4/1987 | Gülck ................................. 358/225 |
| 4,747,155 | 5/1988 | Dotson ............................ 358/109 X |

OTHER PUBLICATIONS

"Development of an Advanced Optical Objective Lens of Extreme Characteristics", R. H. Wight, Paper presented at The American Congress on Surveying and Mapping and the American Society of Photogrammetry Convention, Washington, D.C., Feb. 23, 1976.

"Evaluation of the Electronic Wide-Angle Camera System", Rachel and Roberts, at p. 129 of the proceedings (designated v.137) of SPIE Conference on *Airborne Reconnaissence III* (1978).

"Design Versatility of the Prism Panoramic Camera", Ruck, of the proceedings (designated in v.309) of SPIE conference on *Airborne Reconnaissance V* (1981).

"Comparing Dioptric, Catoptric, and Catadioptric Reconnaissance Lenses Tailored for Silicon CCD Detectors", Matthews and Wright, from *Proceedings of SPIE: Airborne Reconnaissance IX, 1985*.

"Objectifs Photographiques Grand-Angulaires Utilisant une Surface Parabolique", Hugues, Japanese Journal of Applied Physics, v.4, Supp. 1, 1965 (Proceedings of the Conference on Photographic and Spectroscopic Optics 1964).

Primary Examiner—James J. Groody
Assistant Examiner—Victor R. Kostak
Attorney, Agent, or Firm—Saidman, Sterne, Kessler & Goldstein

[57] ABSTRACT

An electro-optic system which is advantageous for low altitude, high speed aerial reconnaissance. A linear imager is movably positioned in the focal plane of a fixedly mounted wide-angle lens system. The fore-aft motion capability of the imager can be used to select an optimal viewing angle for recognition, for image motion compensation (to reduce smear), or for other functions.

96 Claims, 6 Drawing Sheets

STEERABLE WIDE-ANGLE IMAGING SYSTEM

BACKGROUND OF THE INVENTION

The present invention relates to imaging systems. The present invention particularly relates to imaging systems for airborne reconnaissance.

Various known teachings which are believed to be related to various ones of the innovations disclosed herein will now be discussed. However, it should be noted that not every idea discussed in this section is necessarily prior art. For example, characterizations of particular patents or publications may relate them to inventive concepts in a way which is itself based on knowledge of some of the inventive concepts. Moreover, the following discussion attempts to fairly present various suggested technical alternatives (to the best of the inventor's knowledge), even though the teachings of some of those technical alternatives may not be "prior art" under the patent laws of the U.S. or of other countries.

Viewing Angle

The many known aerial reconnaissance systems have used various viewing angles. Some have imaged the ground at nadir (i.e. directly below the platform), some have imaged the ground at a large forward or side oblique angle, and others have used intermediate values.

However, it has been generally recognized in the art that no single viewing angle is best for all conditions. That is, depending on the features of the particular target being sought, and on such other factors as the surrounding terrain, time of day, and general background illumination characteristics, a more oblique or less oblique viewing angle may at various times be optimal for recognition.

Therefore, some attempts have been made to provide a reconnaissance system with a variable viewing angle. One such attempt is the use of a reconnaissance system including two lenses, at different angles, aligned to focus onto a common focal plane. By unshuttering one lens only, some selection of viewing angle could be achieved. However, this system has limited flexibility, and presents very difficult problems of optical alignment. Another previous idea was to mount the whole assembly so that it could be pivoted to the desired pointing angle. However, this negatively affects cost, weight, bulk, and reliability, and may also require a larger external window in the platform.

Electro-Optic Reconnaissance

In electro-optic systems, an optical train images ground features onto an imager, and the imager electrically measures the image intensity at a number of locations. (Each such location is referred to as a picture element, or "pixel.")

There are significant potential advantages to using electro-optic sensing methods in aerial reconnaissance applications. However, normal area imaging formats are not at all suitable. For example, standard NTSC image format is less than 600 pixels wide, but this falls far short of the resolution required in many aerial reconnaissance applications. For example, reconnaissance cameras using roll film will often have resolutions equivalent to 20,000 pixels or more in width.

One potential advantage of electro-optic devices in reconnaissance systems is that data can be transmitted to remote locations, without awaiting physical transfer of film. Another potential advantage is that the delays and logistics requirements of emulsion processing can be avoided. Another potential advantage is that the output of an electro-optic imager is inherently better suited to interface to the image-recognition algorithms which may be developed in the future. Another potential advantage is that, as the capability to make images more understandable by preprocessing them advances, the output of electro-optic imagers will also be better suited to preprocessing techniques.

One well-known type of electro-optic imager is a charge-coupled device, or "CCD." A CCD is a semiconductor device wherein each imaging site is a potential well for minority carriers (normally electrons). Each potential well will collect electrons generated by photon absorption in its vicinity. The CCD output indicates the amount of charge collected in each well, and therefore the photon flux seen at each well.

Often a linear imager will be used, so that what is imaged is a strip on the ground. The motion of the platform sweeps this strip along the ground, at the speed of the platform, to produce a large combined image. In such systems, the use of an imager which has a large number of pixels will help to achieve high resolution, subject to the constraints of the optics. For example, it has been suggested that a linear CCD could be used as an electro-optic sensing element in an aerial reconnaissance system. See Rachel and Roberts, "Evaluation of the Electronic Wide Angle Camera System," at page 129 of the proceedings (designated volume 137) of SPIE conference on *Airborne Reconnaissance III* (1978), which is hereby incorporated by reference. Note that this publication suggests that a linear CCD can be thought of as analogous to a scanning slit used to expose film.

V/H, Smear, and Integration Time

There has been no good way to obtain good quality images from an aerial platform which is moving at extreme combinations of low altitude and high speed. In modern military air tactics, it has been increasingly recognized that the combination of low altitudes and high speeds offer great advantages in reducing the likelihood of detection and increasing the chances of survival of a tactical mission. The use of low altitude reduces the chance of detection, and the use of high speed increases the chance that the aircraft will escape from fire directed by hostile ground forces which do happen to detect it.

Thus, it would be extremely desirable if a low altitude reconnaissance system could be made better able to operate at low altitudes and higher speeds. A sample set of operating conditions for a low-altitude imager would be an altitude of 500 feet at a speed of 500 knots. Lower altitudes would increase survivability, although much lower altitudes might undesirably reduce the width of the scanned track. (At 500 feet, a 140° field of view would correspond to an image track of slightly more than half a mile, if the ground surface is clear and level.) Higher speeds might be useful in some applications.

However, the combination of low altitude and high speed means that the image of the ground will be moving very fast on the focal plane. (A parameter which is often used to characterize such conditions is the ratio of speed (velocity) to altitude, or "V/H ratio." The larger the V/H ratio, the faster the apparent image motion will be.) Faster image motion means that "smear" of the image is likely to be a problem.

Smear is the limitation in resolution, along the direction of motion of the airborne platform, imposed by the integration time of the imager. In a CCD, each pixel must be allowed to collect charge for a certain interval before the charge can be measured. This interval is known as the "integration time." In a linear CCD, higher line transfer rates imply lower integration times. (The integration time of an electro-optic imager is in many ways analogous to the exposure time in a photographic system.) At high V/H ratios, smear may limit in-track resolution to significantly less than the optics would otherwise permit. Smear can be minimized by shrinking the dimensions of the pixels and increasing the line transfer rate, if the image brightness is sufficient and if the line transfer rate is not already at its maximum.

However, if greater image brightness is needed, faster (higher numerical aperture) optics must be used. Faster optics are inherently more expensive and heavier. Moreover, increasing the numerical aperture of the optics may conflict with other optical performance parameters, such as field of view.

In electro-optic imaging, unlike photography, the signal level of a dark image can be adjusted on-line, to bring out at least some additional detail. However, such amplification cannot recreate information which is not present in the series of charge values in the wells of the imager. If the signal in the wells does not contain scene information, then amplification of it will merely provide a noise output.

Thus, in some low-light imaging applications, there will be an inherent tradeoff between smear reduction and noise reduction. If short integration times (i.e. faster line transfer rates) must be used, the signal level of pixels at the brightest parts of the image scene may not be as far above the noise floor as would be desirable. For example, in a CCD where the noise floor is about 50,000 electrons per well and the well capacity is about 600,000 electrons per well, a photon flux equivalent to a maximum signal level of only 10,000 electrons per well will obviously result in a degraded signal-to-noise ratio. While various known measures (such as imager cooling or signal processing) can be taken to enhance the signal-to-noise ratio, shorter integration times will still imply degraded noise characteristics, at sufficiently low light levels.

An article by Ruck, entitled "Design versatility of the prism panoramic camera," from the SPIE conference entitled *Airborne Reconnaissance V* (1981)(SPIE volume 309), which is hereby incorporated by reference, presents one approach to forward motion compensation at large V/H ratios.

Stereo Imaging

In many reconnaissance applications, stereo imaging can provide improved recognition and/or dimensional measurements. Of course, stereo imaging could be done by performing two passes. However, such methods make it more difficult to extract three-dimensional data, since the spatial relation between the two imagers would not be precisely known a priori.

One-pass stereo imaging has been performed, in the aerial reconnaissance art, by using two cameras, with different pointing angles, mounted on a common platform. Another approach which has been used is to take multiple overlapping frames of photography with a single camera.

Wide-Angle Optics

A 1976 paper by Ralph Wight, entitled "Development of an Advanced

A 1976 Optical Objective Lens of Extreme Characteristics," presented at the American Congress on Surveying and Mapping/American Society of Photogrammetry (Washington D.C., Feb. 23, 1976), describes a low distortion wide-angle lens. Note, in FIG. 2 thereof, that a lens with a 140 degree field of view and a 1.3 inch length is shown. Note that the inner surface of the front element is shown as an ellipsoidal surface. Note also that this article mentions that "the required broad spectral correction resulted in the use of glasses having anomalous partial dispersions in order to obtain apochromatic performance throughout the field of view."

This article also discusses an earlier article by Hugues, entitled "Objectifs Photographiques Grand-Angulaires Utilisant une Surface Parabolique", Japanese Journal of Applied Physics, Volume 4, Supplement 1, 1965 (Proceedings of the Conference on Photographic and Spectroscopic Optics, 1964). The Hugues article described use of a paraboloidal front surface. As shown in FIGS. 12 and 13 of the Wight article, the maximum distortion of this lens is about 0.08 inches.

A paper by B. Mathews and R. Wight, from the *Proceedings of SPIE: Airborne Reconnaissance IX*, 1985, discusses the relative merits of refractive (dioptric), reflective (catoptric), and hybrid (catadioptric) optics for reconnaissance systems using silicon CCDs.

SUMMARY OF THE INVENTION

Various innovative teachings will now be discussed, and some of their respective advantages described. Of course, not all of the discussions in this section define necessary features of the invention (or inventions), for at least the following reasons: (1) various parts of the following discussion will relate to some (but not all) classes of novel embodiments disclosed; (2) various parts of the following discussion will relate to innovative teachings disclosed but not claimed herein; (3) various parts of the following discussion will relate specifically to the "best mode contemplated by the inventor of carrying out his invention" (as expressly required by the patent laws of the U.S.), and will therefore discuss features which are not necessary parts of the claimed invention; and (4) the following discussion is generally quite heuristic, and therefore focusses on particular points without explicitly distinguishing between the features and advantages of particular subclasses of embodiments and those inherent in the invention generally.

The present invention provides an imaging system wherein an imager (preferably a linear CCD) is moveable within the focal plane of a fixed lens to permit selection of viewing angle, or provide improved imaging under high-smear or low-light conditions, or provide one-pass stereo imaging, or improved "snapshot" imaging of a full field of view.

An important advantage of the focal plane movement provided in the present invention is that the viewing angle can be adjusted for optimal recognition characteristics. That is, depending on the features of the particular target being sought, and on such other factors as the surrounding terrain, time of day, and general background illumination characteristics, a more oblique or less oblique viewing angle may at various times be optimal for recognition. Therefore, depending on the optimum for a given mission, the position of the focal plane 110 can be adjusted so that the line imaged can be directly below the air vehicle (at nadir), behind the air vehicle (aft of nadir), far ahead (imaged at an angle of only 30° below the horizon), or at any angle in between. Another consideration in selecting oblique viewing angle may be survivability of the reconnaissance vehicle, since a more oblique viewing angle means that high-threat targets can be identified at a greater standoff distance. Another consideration may be atmospheric transparency: under conditions where significant smoke, fog, or haze are present, a less oblique viewing angle may mean a clearer view of the ground.

The innovative teachings herein also permit reduction of image smear. The V/H ratio, together with the focal length of the lens, will generally determine the rate of apparent motion of the image at the center of the focal plane. Where the image smear is excessive, at the maximum available clock rate of the CCD, the imager 110 can be moved in a fore-aft direction, in the same direction as the apparent motion of the image, to reduce the image apparent motion.

Image motion reduction will often be unnecessary. For many applications, the imager 100 can be used in a "push broom" mode, where the linear imager is not moved during the reconnaissance run. Depending on the V/H ratio (i.e., the ratio of the velocity of the air vehicle to its altitude), clock rates of 400–2,000 lines per second have generally been found to be acceptable in reducing smear. (However, note that high clock rates require an adequate image brightness level (determined by the ambient illumination, the optical train, and the target characteristics), or the image may be quite noisy.)

This capability can also be used to enhance the equivalent image brightness, under very low light levels. By moving the imager in the same direction as the apparent motion of the image, the integration time for each line of output can be increased, until the imager reaches the end of its travel within the focal plane.

The system and method innovations disclosed herein also permit stereo images of a desired location to be obtained in one pass. This is accomplished by viewing the same region twice as the aircraft flies by. Since the two views will be seen at different viewing angles, some three-dimensional information is obtained.

A further application is to use imager motion, within the focal plane, to more rapidly image a full field of view. This is particularly advantageous for terrain-following air vehicles, which can image a usefully large area (at a known location) during a very brief pop-up. This enhances survivability. This is accomplished by moving the imager opposite to the apparent image motion, to capture a full frame image as rapidly as possible. Resolution, in such applications, may be limited by brightness and CCD clock rate.

Thus, the system of the present invention permits any one of the following advantages to be obtained, depending on how the CCD drive circuitry and the imager translation actuators are operated:

(1) The viewing angle can be adjusted for optimal recognition performance. This adjustment can be performed rapidly, so that a wide range of ambient lighting, atmospheric conditions, target type, and surrounding terrain can be accommodated.
(2) Stereo images of a desired location can be obtained in one pass.
(3) Image smear due to extreme V/H (velocity over height ratios) can be compensated for.
(4) Enhanced images of a desired location, under low-light conditions, can be obtained.
(5) The imager can be moved opposite to the apparent image motion, to capture a full frame image as rapidly as possible. Resolution in this case will be limited by brightness and CCD clock rate.
(6) Dynamic scanning can also be used to get a low-resolution lookahead value for brightness levels in portions of the scene which have not yet been scanned. This can be done (e.g. at intervals of a few seconds or a few tens of seconds) by rapidly traversing the imager through portions of the scene forward of the primary scan line, and then snapping it back to the primary scan line. Preferably an additional scan step can be added, so that no strips of ground will be skipped. Thus, this embodiment permits the functions of a conventional "AGC" camera to be obtained, without actually having a separate AGC camera present.

Preferably a wide-angle lens is used which provides substantially one-to-one imaging across the whole focal plane. This simplifies the use of a moving sensor: since there is essentially no distortion which varies within the focal plane, the imager can be shifted in the focal plane without having to compensate for any such position-dependent distortion.

A further advantage of this system, as compared to systems where the whole camera assembly is pivoted on gimbals, is that the external window 112 can be smaller than would otherwise be required. That is, since the lens assembly 100 is fixed, its field of view is accurately known, and the window 112 can be made no larger than necessary to accommodate this field of view. This in turn provides advantages of cost, weight, and reliability of window 112.

Some of the innovative teachings disclosed herein could be used in imaging systems other than airborne reconnaissance systems, particularly for high-resolution imaging of an object which has rapid apparent motion. However, the primary application contemplated is aerial reconnaissance, and the innovations taught herein are particularly advantageous in that context.

BRIEF DESCRIPTION OF THE DRAWING

The present invention will be described with reference to the accompanying drawings, wherein.

DESCRIPTION OF THE PREFERRED EMBODIMENTS

The numerous innovative teachings of the present application will be described with particular reference to the presently preferred embodiment, wherein these teachings are advantageously applied to the particular problems of low-altitude reconnaissance. However, it should be understood that this embodiment is only one example of the many advantageous uses of the innovative teachings herein.

General System Configuration

Figure 1B:
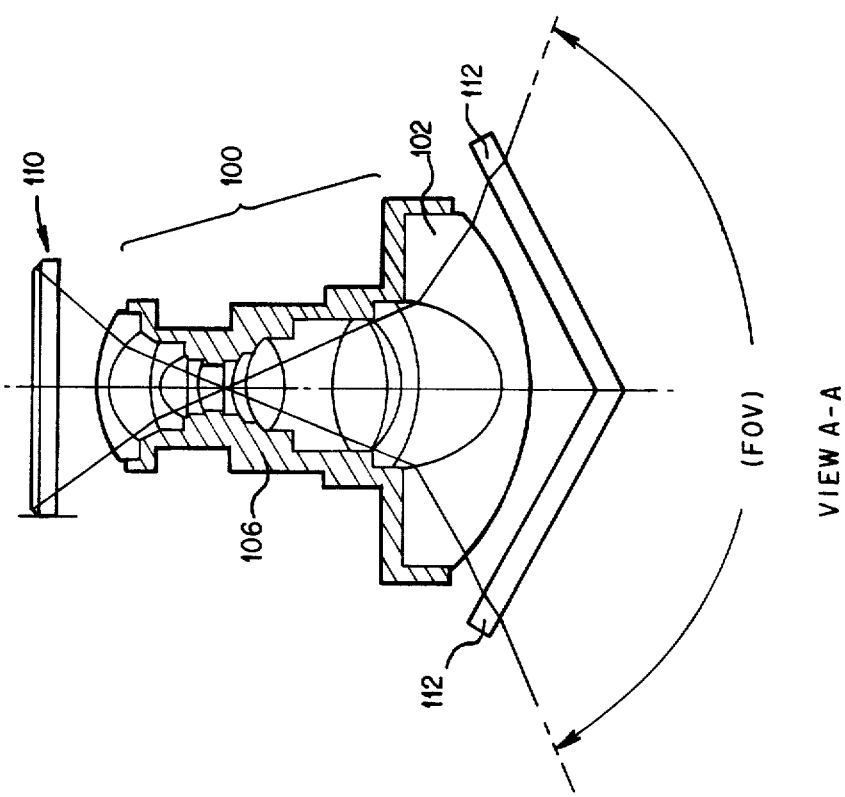
FIG. 1B is another schematic view of the embodiment of FIG. 1A, shown in a section as seen from the front of the aircraft.
Figure 1A:
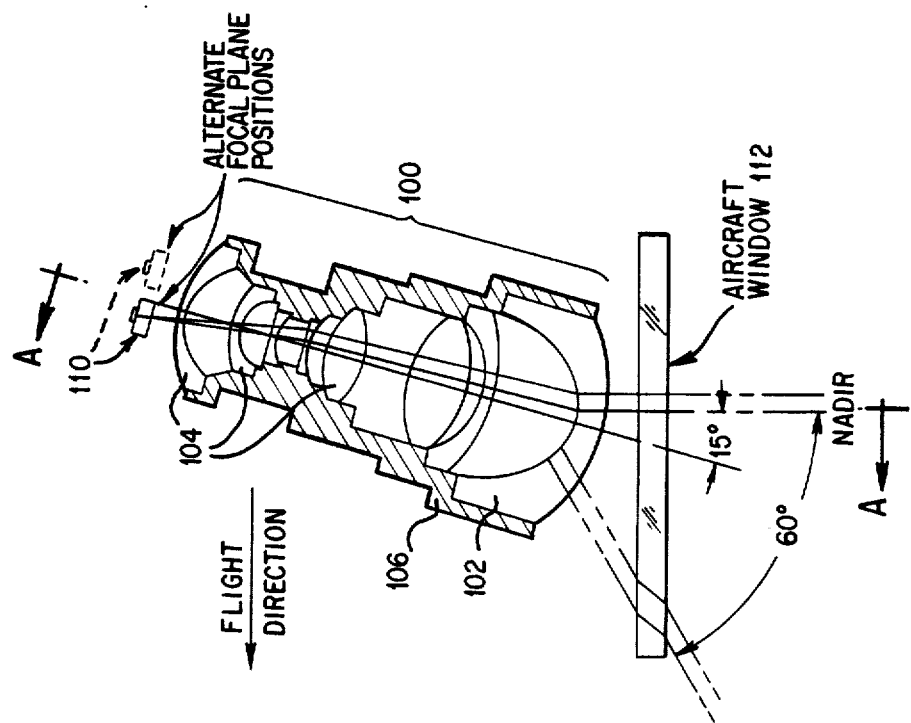
FIG. 1A shows a view of important portions of a sample embodiment of the invention, as seen (in section) from the left side of the aircraft.

FIG. 1A shows a view of important portions of a sample embodiment of the invention, as seen (in section) from the left side of the air craft. A lens assembly 100 is mounted essentially fixedly with respect to the body of the aircraft, in such a position that ground objects seen through the external window 112 are imaged onto an imager 110.

As schematically shown by the dashed line views, the imager 110, if shifted toward the rear of the aircraft, will image a ground portion which is farther forward of the aircraft.

The lens assembly 100 is preferably a multi-element wide angle lens.

FIG. 1B shows another sectional view of the embodiment shown in FIG. 1A. In FIG. 1B, this embodiment is shown in a section as seen from the front of the aircraft. As may be seen from comparison of FIGS. 1A and 1B, the front element 102 of the lens assembly 100 is not shown as a round element. (In the presently preferred embodiment, this element is slabbed (i.e. has lateral flats ground into it) on two sides.) The field of view in the plane of FIG. 1B (more than 135°) is substantially larger than the field of view which is necessary in the plane shown in FIG. 1A (in this embodiment, approximately 60°).

However, this slabbing is done primarily for reduced physical size of packaging, and could readily be omitted. This would mean that the fore-aft field of view could be greatly increased. For example, in applications where extensive use of dynamic imager motion is desired (e.g. in applications where image motion compensation or low-light imaging are particularly important), the ability to scan aft of nadir might be useful, since this would mean that the total range of motion of the imager could be increased. This would therefore mean that the length of the frame which could be scanned without slowing or reversing the motion of the imager would be longer. Similarly, the extended fore-aft field of view might be particularly useful for applications where stereo imaging was particularly desirable.

In the presently preferred embodiment, the lens assembly 100 includes, in addition to front element 102, twelve other lens elements 104, mounted in a stainless steel body 106. (Preferably the body 106 is rigidly mounted at points close to its center of gravity, to further reduce internal stressing of the lens assembly when mounted to the air frame.)

In FIG. 1B it may also be seen that the aircraft window 112 is preferably V-shaped, to provide a maximal field of view with minimal size distortion.

In the presently preferred embodiment, a novel lens assembly 100 is used, which conveys particular advantages in combination with the other innovative teachings presented herein. However, it should be noted that other wide-angle optics assemblies could be used with the novel system configuration described.

Lens Assembly

In the presently preferred embodiment, the lens assembly 100 is an equal-area wide angle lens. That is, the lens assembly is preferably of a form with the very desirable property that straight lines are imaged as (almost perfectly) straight lines on the focal plane, even near the edge of the field. Moreover, equal areas on the ground are imaged as equal areas on the focal plane.

The presently preferred embodiment of the lens assembly 100 uses a front element 102 which has an ellipsoidal inner surface 102A. (Note that such an ellipsoidal inner surface, for the front element of a wide angle lens, is described in FIG. 2 of the 1976 Wight paper cited above.)

This optical property is extremely useful in the system context shown. Not only is the equal-area imaging property generally useful for interpretation, but it is particularly advantageous in combination with the focal plane movement shown. The low level of position-dependent distortion means that the imager 110 can be moved within the focal plane without compensation for image distortion. Thus, by decoupling the imager position within the focal plane from the geometrical relation between image and object, this lens system is particularly advantageous. However, other lens systems could be used instead.

Following are some specific recipes for implementation of the novel wide-angle lens used in the presently preferred embodiment. (While lens systems of this type are particularly advantageous, other lens embodiments could be used instead.) Dimensions in these recipes are given in inches.

The various glass types referred to in the lens recipes disclosed herein refer to standard types. However, for supererogatory clarity, and to guard against obsolescence, the exact specifications of the glass types referred to in Table 3 are filed herewith as an appendix.

In these recipes, the parameters of the aspheric surfaces are specified using the conventional fitting formula $$Z = \frac{(CURV)Y^2}{1 + (1 - (1 + K)(CURV)^2 Y^2)^{0.5}} + AY^4 + BY^6 + CY^8 + DY^{10}$$

Table 1 shows the recipe for one embodiment of the lens system. In this recipe, aspheric surface A(1) has parameters CURV=1.00552470, K = −0.455869, A= −0.000578102, B= −0.000457607, and C and D equal to zero. Aspheric surface A(2) has parameters CURV= −1.03453220 and K= −0.203470, and higher-order parameters A through D each equal to zero.

Table 2 shows the recipe for an alternative embodiment of the lens system. In this recipe, Aspheric surface A(1) has parameters CURV = −1.11707468 and K= −0.455869, and its higher-order parameters A through D are all equal to zero. In this lens system, a movement of 0.0054 inches will produce defocussing.

Table 3 shows the most recently modified embodiment, which is presently preferred. (Note that this embodiment, unlike the embodiment in Table 1, includes only one aspheric surface.) In this recipe, Aspheric surface A(1) has parameters CURV=1.0488885 and K= −0.492136, and its higher-order parameters A through D are all equal to zero.

TABLE 1

| ELEMENT | RADIUS$_F$ | RADIUS$_B$ | THICKNESS | APERTURE$_F$ | APERTURE$_B$ | GLASS |
|---|---|---|---|---|---|---|
| OBJECT | | INF | INFINITY | | | |

TABLE 1-continued

| ELEMENT | RADIUS$_F$ | RADIUS$_B$ | THICKNESS | APERTURE$_F$ | APERTURE$_B$ | GLASS |
|---|---|---|---|---|---|---|
| 1 | 4.6424 CX | A(1) | 0.2124 | 5.4000 | 2.6791 | LAFN2 (Schott) |
|   |   |   | 1.2257 |   |   |   |
| 2 | 2.3000 CX | 1.2935 CC | 0.1337 | 2.6570 | 2.2593 | LAKN13 (Schott) |
|   |   |   | 0.3771 |   |   |   |
| 3 | 2.3577 CX | −2.2573 CX | 0.7097 | 2.2598 | 2.2183 | SF8 (Schott) |
| 4 | −2.2573 CC | −80.3249 CX | 0.7467 | 2.2183 | 1.9436 | LAFN2 (Schott) |
|   |   |   | 0.3132 |   |   |   |
| 5 | 1.8288 CX | −2.4712 CX | 0.5000 | 1.6859 | 1.5768 | FK5 (Schott) |
| 6 | 6.3651 CX | −1.0586 CX | 0.2895 | 1.1665 | 1.0382 | BASF51 (Schott) |
| 7 | −1.0586 CC | −3.5475 CX | 0.1015 | 1.0382 | 0.8642 | SF6 (Schott) |
|   |   |   | 0.0560 |   |   |   |
|   | APERTURE STOP |   |   |   | 0.6550 |   |
|   |   |   | 0.0170 |   |   |   |
| 8 | −10.6223 CC | 0.7193 CC | 0.1000 | 0.6675 | 0.8150 | KZSF5 (Schott) |
| 9 | 0.7193 CX | −0.7813 CX | 0.3931 | 0.8150 | 0.8970 | BAF13 (Schott) |
| 10 | −0.7813 CC | 3.6323 CC | 0.1377 | 0.8970 | 1.1335 | LASF15 (Schott) |
|   |   |   | 0.0106 |   |   |   |
| 11 | 4.7513 CX | −0.8588 CX | 0.4624 | 1.1338 | 1.2777 | PSK53 (Schott) |
| 12 | −0.8588 CC | −1.4303 CX | 0.1023 | 1.2777 | 1.4825 | LASF15 (Schott) |
|   |   |   | 1.1596 |   |   |   |
| 13 | A(2) | −2.2250 CX | 0.1000 | 2.0566 | 2.9172 | KZFS5 (Schott) |
|   |   |   | 0.1005 |   |   |   |
| 14 | INF |   | INF 0.0400 | 4.6038 | 4.6442 | Sapphire |
|   | IMAGE DISTANCE = |   |   | 0.0300 | (IMAGE$_{inf}$ = 5.6462) |   |

TABLE 2

| ELEMENT | RADIUS$_F$ | RADIUS$_B$ | THICKNESS | APERTURE$_F$ | APERTURE$_B$ | GLASS |
|---|---|---|---|---|---|---|
| OBJECT |   | INF | INFINITY |   |   |   |
| 1 | 4.3357 | A(1) | .2750 | 4.6800 | 2.3664 | LAFN2 |
|   |   |   | .9362 |   |   |   |
| 2 | 2.0750 | 1.0632 | .1500 | 2.3456 | 1.9047 | LAKN13 |
|   |   |   | .3710 |   |   |   |
| 3 | 2.1253 | −1.9512 | .5838 | 1.9056 | 1.8686 | SF8 |
| 4 | −1.9512 | −23.4607 | .5522 | 1.8686 | 1.6685 | LAFN2 |
|   |   |   | .3489 |   |   |   |
| 5 | 1.4949 | −2.0927 | .4500 | 1.3927 | 1.2705 | FK5 |
|   |   |   | .0100 |   |   |   |
| 6 | 3.5225 | −.8984 | .2647 | .9896 | .8607 | BASF51 |
| 7 | −.8984 | −3.6526 | .0900 | .8607 | .6925 | SF6 |
|   |   |   | .0435 |   |   |   |
|   | APERTURE STOP |   |   | .4849 |   |   |
|   |   |   | .0353 |   |   |   |
| 8 | −8.0166 | .5765 | .0900 | .5260 | .6639 | KZFS5 |
| 9 | .5765 | −.7378 | .3256 | .6639 | .7433 | BAF13 |
| 10 | −.7378 | 2.6553 | .0900 | .7433 | .9071 | LASF15 |
|   |   |   | .0110 |   |   |   |
| 11 | 3.6731 | −.6979 | .3741 | .9074 | 1.0282 | PSK53 |
| 12 | −.6979 | −1.3535 | .1000 | 1.0282 | 1.2308 | LASF15 |
|   |   |   | .0300 |   |   |   |
| 13 | −.8322 | −1.6457 | .1000 | 1.6306 | 2.3430 | KZFS5 |
|   |   |   | .0300 |   |   |   |
| 14 | INF | INF | .3000 | 3.9320 | 4.3333 | ZKN7 |
|   |   |   | .0204 | (IMAGE$_{inf}$ = 5.1567) |   |   |

TABLE 3

| ELEMENT | RADIUS$_F$ | RADIUS$_B$ | THICKNESS | APERTURE$_F$ | APERTURE$_B$ | GLASS |
|---|---|---|---|---|---|---|
| 1 | 5.3486 CX | A(1) | 0.1829 | 5.0237 | 2.6003 | LAF2 Schott |
|   |   |   | 1.0726 |   |   |   |
| 2 | 2.3616 CX | 1.4003 CC | 0.1000 | 2.5830 | 2.2784 | SFL03 Ohara |
|   |   |   | 0.3169 |   |   |   |
| 3 | 2.5372 CX | −1.6185 CX | 0.8653 | 2.2786 | 2.2292 | SFN64 Schott |
| 4 | −1.6185 CC | 25.5119 CC | 0.7603 | 2.2292 | 1.8132 | LAKN13 Schott |
|   |   |   | 0.2581 |   |   |   |
| 5 | 1.5605 CX | −2.5139 CX | 0.6265 | 1.5891 | 1.3693 | FK5 Schott |
|   |   |   | 0.0103 |   |   |   |
| 6 | 28.1910 CX | −1.0724 CX | 0.2649 | 1.1637 | 1.0556 | SFN64 Schott |
| 7 | −1.0724 CC | −3.7322 CX | 0.1000 | 1.0556 | 0.8994 | SF6 Schott |
|   |   |   | 0.0997 |   |   |   |
|   | APERTURE STOP |   |   |   | 0.6260 |   |
|   |   |   | 0.0170 |   |   |   |
| 8 | 20.5527 CX | 0.7206 CC | 0.1000 | 0.6493 | 0.7863 | KZFSN5 Schott |
| 9 | 0.7206 CX | −0.7513 CX | 0.3926 | 0.7863 | 0.8661 | LAKN13 Schott |
| 10 | −0.7513 CC | 6.5245 CC | 0.2557 | 0.8661 | 1.1369 | LASFN15 Schott |
|   |   |   | 0.0360 |   |   |   |
| 11 | 33.5857 CX | −0.8265 CX | 0.4401 | 1.1658 | 1.2813 | PSK53 Schott |
| 12 | −0.8265 CC | −1.5052 CX | 0.1000 | 1.2813 | 1.4968 | LASFN15 Schott |

TABLE 3-continued

| ELEMENT | RADIUS$_F$ | RADIUS$_B$ | THICKNESS | APERTURE$_F$ | APERTURE$_B$ | GLASS |
|---|---|---|---|---|---|---|
| 13 | −1.0946 CC | −2.2038 CX | 1.1499 0.1000 | 2.0779 | 2.8079 | SFN64 Schott |
| 14 | INF | INF | 0.2081 0.0400 | 5.0000 | 5.0000 | SAPHIR |
| IMAGE DISTANCE = | | | 0.0300 | (IMAGE$_{inf}$ = 5.9175) | | |

A flat cover plate is preferably used as the last element in the optical train. This cover plate provides a hermetic seal to protect the CCD imager. This cover plate does not strictly have to be glass; it could alternatively be made of sapphire, quartz, or other high-strength transparent material.

A "fisheye" lens can be thought of as an extreme example of the potential capabilities and limitations of a wide-angle lens. Fisheye lenses can have very wide fields of view, but their images do not correspond to normal human visual perception. A fisheye lens produces an image wherein an object feature at an angle $\theta$ off-axis is imaged onto a linear distance (from the center of the image) which is approximately proportional to $\theta$.

By contrast, a pinhole projecting onto a plane will produce an image wherein an object feature (at an angle $\theta$ away from the axis of the lens) is mapped onto a linear distance h (away from the center of the image plane) which is proportional to tan $\theta$. This means that a flat object plane will be mapped exactly rectilinearly proportionally onto a flat image plane, if the image and object planes are parallel. Such a mapping is perceptually convenient, since it can produce images which are accurately scaled replicas of an object plane. The "tan $\theta$" representation is therefore considered to be the definition of a "distortion-free" normal lens.

A "tan $\theta$" representation is particularly desirable in reconnaissance, since it is desirable to accurately locate ground objects with reference to the ground plane. That is, a perfect "tan $\theta$" representation would correspond approximately to the dimensions of a map.

However, conventional extreme-wide-angle lens designs have not been able to achieve a distortion-free viewing plane. Conventional extreme-wide-angle optics normally produce a "distortion" (defined with reference to the perfect "tan $\theta$" representation) wherein there is a shift in apparent position. This shift will typically be approximately third-order. That is, an object feature at angle $\theta$ off-axis will be imaged onto an off-axis distance D = Atan$\theta$ + Btan$^3\theta$, where A is positive and B is negative. (This distortion component is sometimes referred to as "pincushion" distortion, because of the apparent distortion of images where straight lines do not run through the center of the field. Similarly, third-order distortion may be referred to as "barrel" distortion where B is positive.)

Theoretically, pixel-shift operations could be used to compensate for pincushion or barrel distortion. However, this would not only impose a significant preprocessing load, but also risk degrading image information if not done perfectly.

Another very important consideration in using any wide-angle lens is relative illumination. As is well known in the art, wide-angle lenses tend to appear less bright (i.e., act as if they had a higher f-number) near the edges of the field.

As is well known in the art, distortion and relative illumination can normally be traded off to some extent. A larger negative magnitude for the third-order constant B means that a larger solid angle will be imaged onto a given area of image plane, near the edge of the field, which means that image brightness at such locations will increase.

In the presently preferred embodiment of the wide-angle lens, low distortion and high relative illumination are achieved by using a novel lens design as described below. One of the significant features of this innovative lens design is use of a high degree of pupil coma.

Typically, relative illumination falls off on a fourth-order curve, i.e. conventional wide-angle lenses will typically have a relative illumination proportional to cos$^4\theta$. By contrast, the presently preferred embodiment achieves a fall-off which is more nearly second order, i.e. more nearly follows a cos$^2\theta$ relationship. This means that wider-angle lenses can be implemented, using designs of this type, than would otherwise be possible, for a given minimum relative illumination. For example, the presently preferred embodiment achieves 20% relative illumination at 70° away from the center of the field.

Moreover, the presently preferred class of wide-angle lens designs achieves a linear distortion of as low as 18% at 70° away from the center of the field. That is, the ratio B/A (in the third order image position relation h = Atan$\theta$ + Btan$^3\theta$) is less than 0.03.

In the embodiment of Table 1, the lens brightness is approximately f/4 near the center, and falls off only to approximately f/9 at the edge of the field. This lens has characteristics (at 680 nm) as follows: Effective focal length = 1.0275; back focal length = 0.0371; front focal length = 0.6237; f/ number = 3.3146; image distance (from the last element) = 0.0300; the overall length of the lens system = 7.3421; paraxial image height = 2.8231; half-field angle = 70°; entrance pupil diameter = 0.3100, at a distance of 1.3558; exit pupil diameter = 0.4351, at a distance of −1.4050; and aperture stop diameter = 0.6550. (All dimensions are in inches.)

These low-distortion and uniform relative illumination characteristics mean that enhanced performance with an imager which can move across a very large focal plane is possible. These characteristics also mean that a reduced processing load is required for image rectification.

Another advantage of this particular lens assembly is that it is substantially apochromatic. Even where color imaging is not desired, this property provides high resolution with no need to degrade the light collection efficiency by filtering out wavelengths. In the presently preferred embodiment, the lens system is optimized with respect to the sensitivity characteristic of the CCD imager preferably used, so that the wavelengths to which the CCD is most sensitive are those which are most highly weighted in optimizing the chromatic sensitivity of the lens assembly 100.

A significant design requirement, in electro-optical imaging systems, is matching the lens focal length to the elemental detector (pixel) size. That is, semiconductor technology is extremely sensitive to the maximum size of the semiconductor element needed. Moreover, the available techniques for combining separate semiconductor devices to achieve a larger total imager area in the focal plane are relatively primitive. Thus, it is highly desirable to achieve a relatively small area imager. For a given resolution, this implies that small area for each pixel is desirable. When a wide angle lens with a wide field of view is desired, this means that an extremely short focal length is necessary. For example, to image a 140 degree wide field of view onto a 5 inch wide image in the focal plane requires a lens with a focal length of about 1.3 inches.

Imager

Preferably the imager 110 is configured as two linear charged coupled devices (CCDs), mechanically abutted. In the presently preferred embodiment, each of the linear CCDs has 6000 pixels, so that the image is 12,000 pixels wide. Linear CCDs are generally well known and widely available. However, the presently preferred embodiment of the imager will now be described in detail, for clarity and because some of the features of this imager are particularly advantageous in the context of the system described.

In the presently preferred embodiment, each of the linear CCDs has 6000 active photosite elements and 20 dark reference elements. Two transfer gates provide parallel transfer: one transfer gate transfers the charge from each of the odd-numbered photosites to a site in a CCD shift register, and the other transfer gate transfers the charge from the even-numbered photosites to another CCD shift register. Each of the two shift registers can be clocked to transfer charge packets along its length to a charge detector and output amplifier. Thus, there are a total of four output lines from the two CCD chips.

The dark reference elements (as is well known in the CCD art) permit the dark current to be subtracted from the raw output, to get a better measure of the optical signal. (A CCD photosite will collect a certain amount of charge at zero illumination, due to traps and other thermally sensitive effects. This amount of charge is referred to as "dark current.") The transfer gates access these dark reference elements analogously to the active photosites.

To facilitate butting the two CCDs together, a trench is etched at the butt end during device processing. The sidewalls of this trench are passivated with channel stop doping and field oxide. This means that a sawing operation can cut through the trench bottom, with reduced risk of destroying the last photosite. This structure also reduces charge leakage into the last photosites. Other known methods are also used to avoid spurious signals: for example, portions of the second metal level are used to screen areas other than active photosites from illumination, and a guard ring preferably surrounds active areas.

Figure 6A:
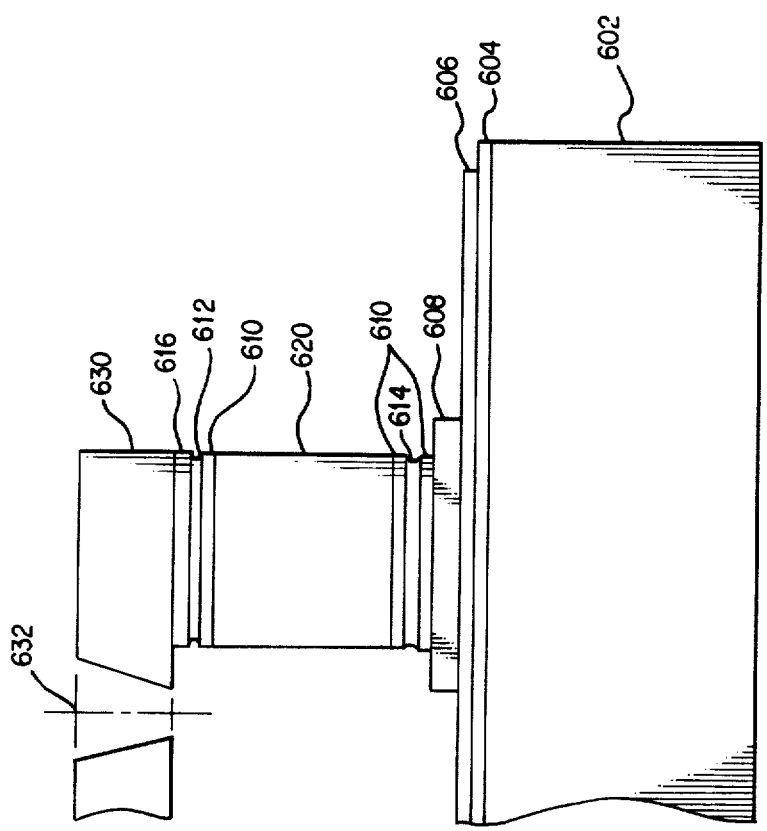
FIGS. 6A through 6C show the presently preferred embodiment of the imager package.

FIG. 6A shows the presently preferred embodiment of the package used for the CCD imager chips. A thick polycrystalline silicon substrate 602 has a thick film insulating glaze 604 and a screenprinted thick-film metallization 606 (preferably gold) overlaid on it. The conductor 606 is patterned to bring leads (for signals, power, ground, etc.) outside of the hermetic seal. Another thick film insulating glaze layer 608 overlies conductor layer 606 in the seal area, to provide a planar sealing surface.

The window 630 (which is preferably sapphire, but may be quartz or other material) is given a thin patterned metal coat 616 on its backside in the seal area. In the presently preferred embodiment, this is a thin layer of Cr/Ni/Au, but other materials may be used instead. This may be deposited, e.g., by evaporation or sputtering.

A silicon frame 620 forms a connection from window 630 to substrate 602. The actual CCD chips are epoxied to substrate 602 inside the ring defined by silicon frame 620. (Preferably this epoxy attachment is performed under a microscope, at a workstation with micrometer manipulation, so that the relative alignment of the CCD chips can be precisely defined.) Stitch bonding is used to connect bond pads on the CCD chips to the traces of metallization 606. A thick film metallization 610 (preferably palladium/silver) is applied to both sides of the frame 620, to permit formation of a solder bond. (The same metallization is preferably applied over glaze 608.) The frame 620 is then soldered (joint 612) to window 630, and this joint is tested for hermeticity. Frame 620 and window 630 can then be soldered (joint 614) to the metal ring on substrate 602, enclosing the CCD chips within a hermetic seal. The package is then purged and backfilled (e.g., with dry helium), and tip-off hole 632 (which was preferably previously metallized) is sealed.

Figure 6C:
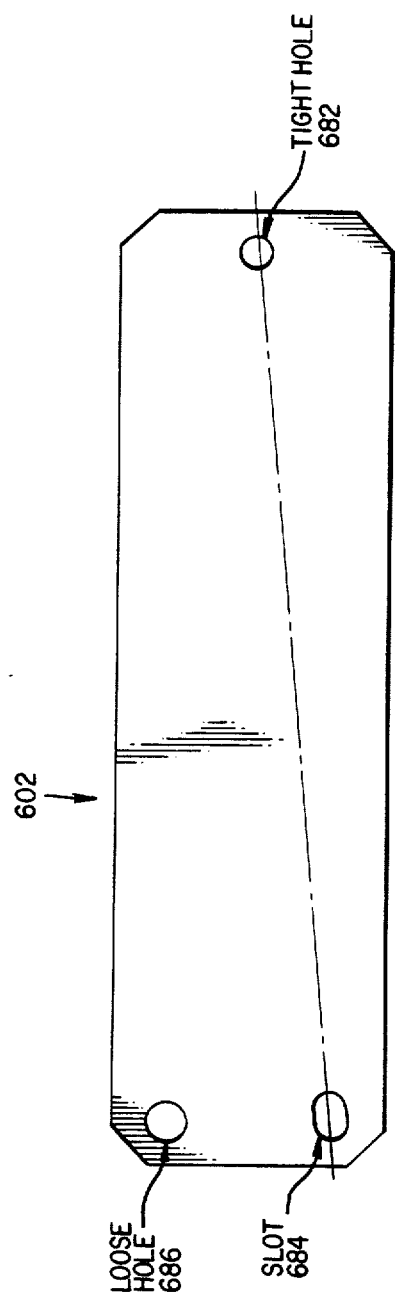
Figure 6B:
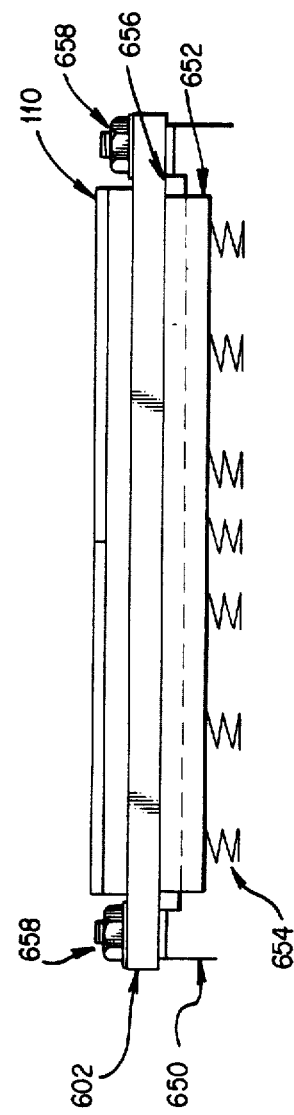

As FIG. 6B shows, the imager thus packaged is preferably attached by stud/nut assemblies 658 to a rigid mount 650 (which includes precision-machined bosses, to assure accurate location of the imager 110 parallel to the focal plane). This rigid mount 650 is connected to the mechanical elements described below, to translate the imager as desired. A thermoelectric cooler 652 is spring-loaded (by springs 654) to make good contact with the substrate 602 (assisted by thermal grease 652).

FIG. 6C shows how the connections to stud/nut assemblies 658 allow for thermal expansion. A tight hole 682 (in substrate 602) is a precision fit. A slot 684 permits free movement in one dimension only. Loose hole 686 permits free movement in two dimensions, but does restrict out-of-plane movement.

A linear CCD can have great advantages over use of an area CCD in aerial photography. However, various of the inventive concepts disclosed herein could also be applied (less preferably) to systems using area imager CCDs. Various of the inventive concepts taught by the present application could also be applied to systems using quasilinear CCDs, such as time delay and integrate (TDI) devices.

It should also be recognized that the "linear" imager used does not strictly have to have a by-1 configuration. For example, a CCD with two or three parallel lines of sensing sites could also be used, and might even be preferable for some purposes (e.g. color imaging, or to provide immunity to single-pixel defects). For another example, it would also be possible to use optical combinations of more CCDs than the two used in the presently preferred embodiment. It should also be recognized that imagers using other electro-optic technologies (such as photodiodes, charge-imaging matrix technology, electron multipliers, etc.) could also be used. The innovations taught herein can also be extended to systems using wavelengths beyond the visible and near-infrared range used by the presently preferred embodiment.

The CCD imager is preferably temperature-stabilized. In the presently preferred embodiment, the paired CCDs are mounted on a silicon substrate (which provides an excellent thermal match). A sapphire cover is used to provide a hermetically sealed front window.

(Sapphire has a good thermal match, but of course other materials could be used instead.) The silicon substrate is preferably mounted on a thermoelectric cooler, which maintains a mean temperature of 10° C.

Mechanical Implementation

Figure 5:
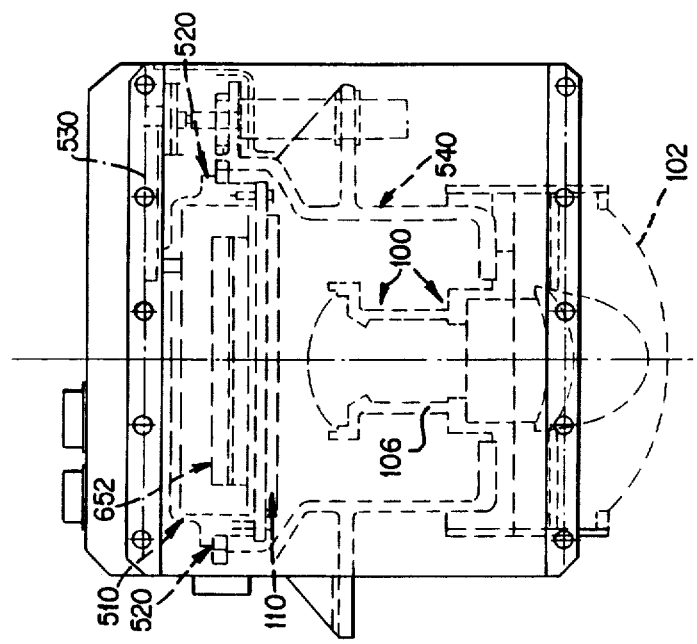
FIGS. 4 and 5 show two views of the mechanical implementation of the presently preferred embodiment.
Figure 4:
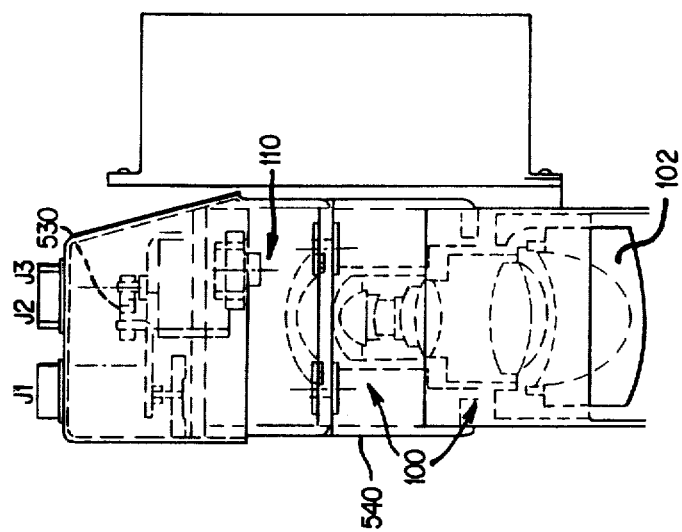

FIGS. 4 and 5 show two sectional views of the presently preferred implementation of the packaging and mechanical interconnections. FIG. 4 is seen from the left side of the air platform, and FIG. 5 is a view at right angles to FIG. 4. Dimensions in inches are shown for convenience, but it should be understood that these dimensions are purely illustrative and may be widely varied. Moreover, neither the proportional relations nor the organization of the parts need be as shown: what is shown is merely an example.

In the presently preferred embodiment, the CCD imager pair 110 is mounted (in contact with thermoelectric cooler 652) on a carrier 510 which slides on a pair of linear slides 520. A lever 530 (rotated by gearmotor 532) pushes the imager carrier 510 back and forth to effect translation of the imager 110 in the focal plane of the lens assembly 100. (These drawings also show the general shape of housing 540, and how the lens assembly subhousing 106 is mounted to housing 540.)

Control

Depending on which of the foregoing objectives are to be accomplished with imager motion, different control strategies may be used. For example, in the presently preferred best mode of using, the motion of the imager is used only to select an optimal viewing angle, and no complicated control strategy is needed. However, where the imager is moved dynamically (i.e. is in motion during the imaging operation), various control strategies may be used.

A significant capability of the disclosed novel system is the ability to translate the scan line along the ground at a rate different from the velocity of the platform. This is accomplished by dynamic motion of the imager (i.e. by moving the imager while imaging). (Note that the ground scan rate can be more or less than the aircraft velocity.) However, since the imager can move only over a limited distance (determined by the size of the image plane, and/or by the mechanism which translates the imager), the long-term average of the imager motion must be equal to zero. That is, the ground scan rate can differ from the aircraft velocity only temporarily. Thus, control strategies for such embodiments must permit the imager position to be restored when it reaches its bounds.

For example, one way to implement a strategy where the ground scan rate is less than the aircraft velocity (temporarily) is as follows. The motion of the imager is controlled using a tri-linear waveform, defined as follows:

First, find the time required for one field of view to pass across the area swept by the imager within the focal plane. (This will be determined by the V/H ratio; by the field of view of the optics; and by the available range of mechanical motion of the imager. For example, for a fore-aft field of view which extends from nadir to 60° forward of nadir, the length of the ground frame seen by an aircraft at 500 feet will be approximately 860 feet. This implies that, at 500 knots, the air vehicle will fly past one ground frame in slightly more than 1.5 seconds.)

From this available time, subtract the total time needed for the imager to move from the trailing edge of the field of view to the leading edge of the field of view.

The remaining time is allocated unequally between portions of the frame; for example, one-third of the frame length might be imaged in two-thirds of the available frame time, to obtain improved sampling and/or low-light imaging, and the remaining two-thirds of the frame could be traversed in one-third of the available time. Optionally, CCD clock rates can be adjusted to provide equal line spacing in the resulting image, or buffering and replication can be used to restore the apparent spacing of scan lines. Thus, the result of such an algorithm would be an image having bands of higher resolution and/or lower noise interspersed in the rest of the image. Such a mixed-resolution image can be used as an input to various image recognition algorithms, or as a source for human interpreters. Alternatively, such a tri-linear control waveform could also be used where a particular location is desired to be imaged in special detail.

As a further alternative, a modified sawtooth waveform with no blanking interval could be used. In this embodiment the imager would be permitted to traverse the whole frame length in the high-resolution mode, and then moved back to the leading edge of the frame while operating in a low-resolution mode. (Note that the motion of the imager during the low-resolution phase would actually increase the sample interval size over that which would be seen with a stationary imager.) Again, adjustment of CCD clock rates and/or buffering and replication could be used to restore equal line spacing in the final image.

Similarly, for one-pass stereo imaging, the imager may be (e.g.) held fixed at the leading edge of the frame, until the half-frame of which a stereo view is desired comes into view. After the target frame has been imaged once with the imager at the leading edge of the frame, the imager is rapidly translated to the trailing edge of the frame, and the same target area is then imaged again.

As discussed above, a wide variety of functions can be accommodated by using the available imager motion. To implement these functions, the imager may be controlled for static motion (i.e. simply move the imager when a different viewing angle is desired); it may be controlled to move repeatedly (e.g. to form a low-light image which is striped with low-noise images); it may be programmed to perform a special function at a preprogrammed location (e.g. a drone could be sent out to form a stereo image of a site at a known location); or it may be programmed to perform a special function upon receiving a realtime command (e.g. when a pilot signals that an enhanced-resolution image is needed).

If stereo, low-light, or reduced-sampling-interval imaging applications are particularly important, it might alternatively be desirable to use multiple linear imagers in the focal plane. For example, use of two linear CCD packages, separated by a fixed spacing and translated by a single mechanism, might be very useful for stereo imaging. For another example, use of two CCDs, each independently movable within one half of the focal plane area, might be advantageous for image motion compensation. While such embodiments are not presently preferred, they do illustrate the extent to which the innovative concepts taught herein can be modified and varied.

Signal Processing

The imager output is preferably processed in a number of ways. The raw output from the CCD wells will not only contain electrical variations which correspond to the detailed appearance of the scene, but will also include variations due to several other sources. These other sources include overall changes in illumination; changes in average brightness level of the objects in the scene; haze or clouds between the platform and the scene; and charge variations due to electrical noise in the CCD.

Figure 2:
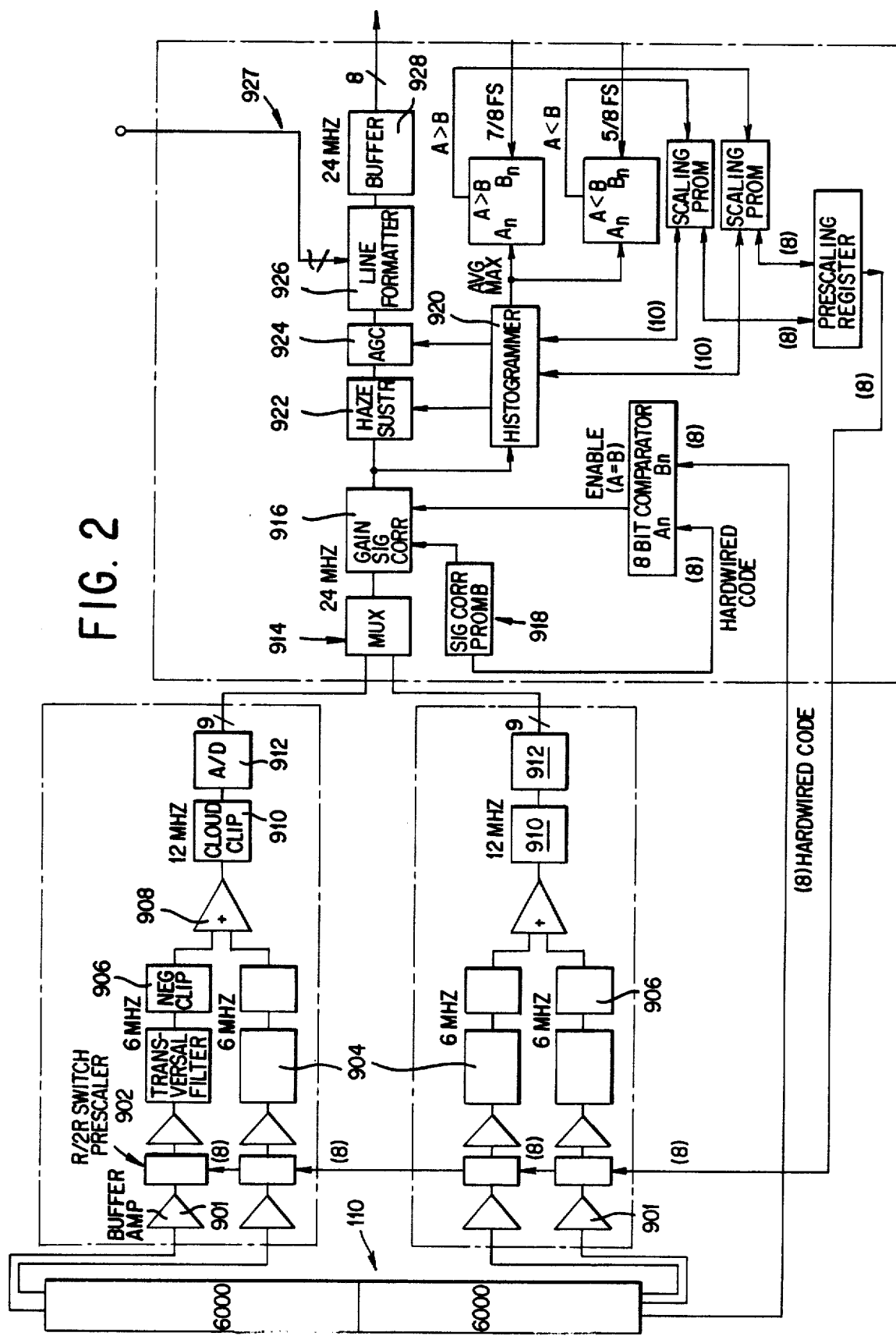
FIG. 2 is a schematic diagram of the signal processing preferably used on the outputs of the imager 110.
Figure 3:
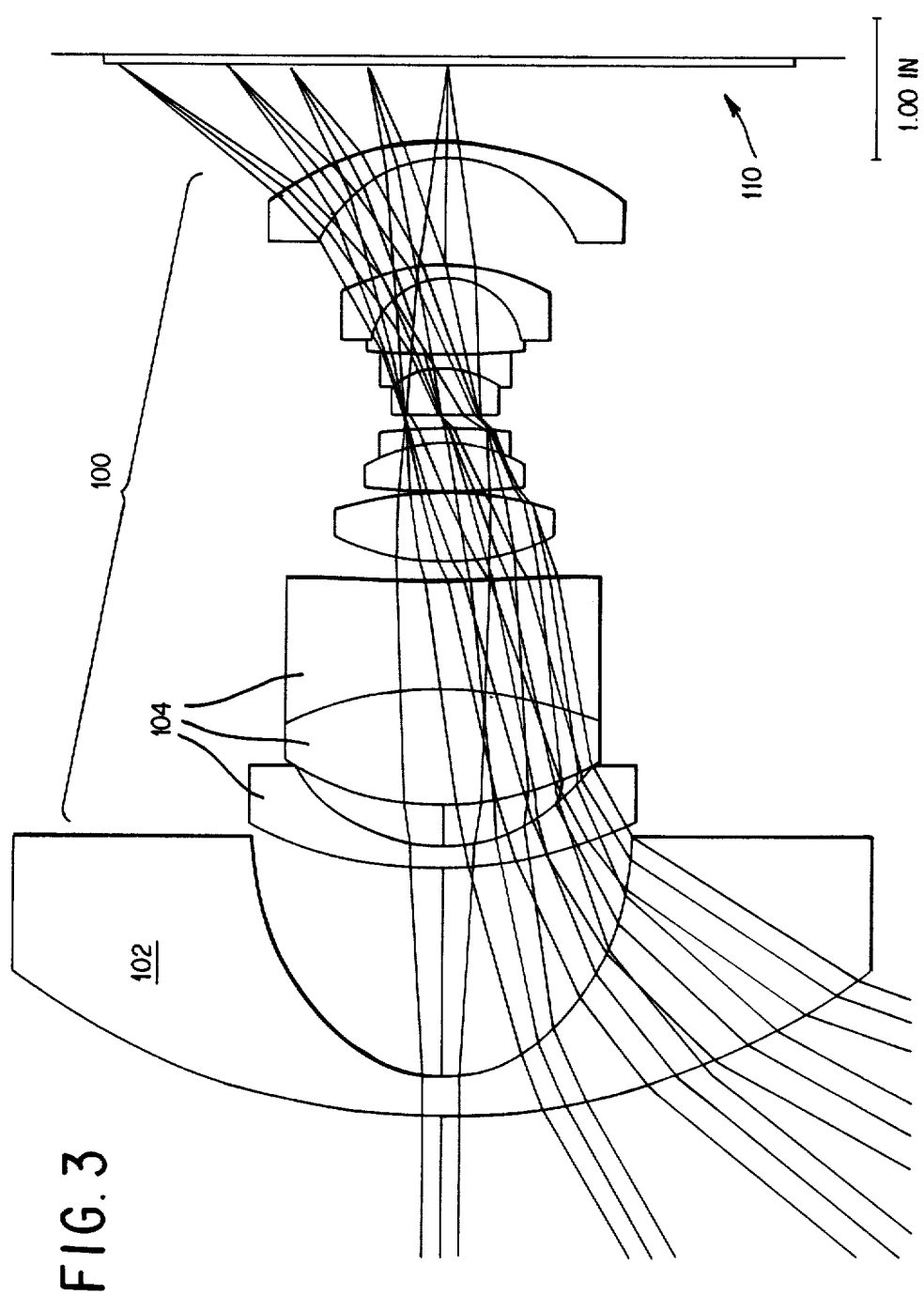
FIG. 3 shows the wide-angle lens preferably used.

FIG. 2 shows generally the routing preferably used. The two CCD chips in imager 110 each have separate outputs for odd and even pixels, so that four parallel channels are used at first. For example, four separate buffer amplifiers 901 and prescalers 902 are shown.

Prescaling

In the presently preferred embodiment, 9-bit quantization is used with prescaling. Prescalers 902 are preferably configured as conventional R/2R ladders, controlled by the signal fed back from later stages.

However, it is contemplated that 10-bit quantization, with fixed gain, may ultimately be preferred. Output signals from the CCD preferably used will correspond to the range from about 600,000 electrons per well saturated signal, down to about 360 electrons per well residual noise signal. Ten bits of resolution, at a fixed scale, can provide substantially adequate measurement over this range.

Analog filtering

Before the CCD output is digitized, it is filtered in the analog domain to remove low-frequency noise. This filtering operation is done with a transversal filter 904 which embodies essentially the same transfer function as a correlated double sampler. A following negative clipping stage 906 keeps the signal in bounds. The four 6 MHz data streams are then multiplexed down to two 12 MHz streams. (The signal format used is such that this combining step can be performed by an analog adder 908.)

Note that the filter 904 performs a function which is different from the analog preliminary stages normally used in any digital system (e.g. offset correction, preamplification, prescaling, and/or antialiasing filter). This transversal filter removes the low-frequency noise components, including kTC and 1/f noise components.

Conventionally, in an analog front end system, such filtering will be accomplished by correlated double sampling. In fact, the transversal filter function preferably used has the same transfer function as a correlated double sampler.

However, one important advantage of the transversal filter is that it is impossible to do matched filtering after correlated double sampling. A possible deterrent to using the transversal filter is that correlated double sampling also strips the pixel clock feedthrough, which the analog transversal filter does not. However, stripping the pixel clock feedthrough is not necessary if the video signal is to be immediately digitized, as it is in the presently preferred application.

Image Brightness Compensation

A/D converters 912 provide 9-bit values for each of the two signal streams, and multiplexer 914 combines the data into a single 9-bit data flow at 24 MHz.

The CCD outputs will be affected by pixel nonuniformities ("pixel signatures") and by position-dependent brightness variation. Pixel signatures result from the nonuniform areas and capacities of the individual collection sites. Position-dependent brightness variation results from the brightness fall-off of the lens: as the imager is moved away from the center of the focal plane, the brightness of the image will be reduced.

In the presently preferred embodiment, image brightness compensation is accomplished (in gain correction stage 916) by multiplying the digitized value of each pixel by a scaling factors. The scaling factors are stored in a PROM 918, as one value for each pixel of the imager. These scaling factors compensate both for the different sensitivities of the various pixels, and also for positiondependent variation in image brightness. (As discussed above, the lens has some brightness fall-off near the edge of its field.)

Gain Control

For optimal recognition, it is desirable to adjust the scaling and offset of the output so that the detail information is clearly recognizable. This is conventionally accomplished by an automatic gain control (AGC) circuit of some sort. A significant difficulty in the prior art has been to perform detail enhancement without introducing artifacts into the image.

The presently preferred embodiment uses a two-dimensional "histogrammer" approach to emphasize the detail information in the scene. Long-term average minimum and maximum values are separately tracked (by histogrammer 920), based on preceding pixels in-track and on all pixels in the cross-track direction. Stages 922 and 924 then scale the pixel values to these two separately-tracked values. Haze subtract stage 922 removes the average minimum, and "AGC" stage 924 scales the pixel values with respect to the average maximum. (Note that these are controlled by inputs from the histogrammer stage 920.)

In addition to the filtering introduced by the histogrammer approach, manual switching (in the analog domain) is used (in the presently preferred embodiment) to remove "cloud spikes" (i.e. spurious horizontal lines caused by atmospheric variations between the platform and the object being imaged). In the presently preferred embodiment, a pilot or operator would directly input a value indicating his estimate of the cloud brightness level seen by the imager, and this value defines the cloud clipping level. However, alternatively, an additional automatic control loop could be used instead. Control subsystems which will provide automatic compensation for these factors are generally familiar to those skilled in the art. This operation is shown as box 910 in FIG. 2.

Adaptive Time Constant

In the presently preferred embodiment, the time constants for both the minimum (i.e., haze-subtract) and maximum (i.e., AGC) level tracking are reduced by an order of magnitude when a step change in scene reflectivity is detected. An overflow/underflow event counter is used to monitor the number of overflow or underflow events seen by the comparators which come after the AGC range scaler networks. Under reasonably normal scaling conditions, only a moderate level of overflow and/or underflow events will be seen. However, a step change in scene reflectivity will cause a sudden large increase in the number of overflow or underflow events. When the counter detects that the rate of such events has increased above a certain level, it will trigger a change in the time constants associated with formation of the minimum and maximum levels. This has the advantage that frame blackout or frame whiteout resulting from a sharp change in the image is avoided.

In the presently preferred embodiment, the time constant change is accomplished by replicating data values being loaded into a register. That is, to reduce the time constant by a factor of ten, each line's minimum and maximum values are loaded ten times into the averaging operation, rather than only once.

Roll Correction

In the presently preferred embodiment, a moderate degree of roll correction is provided by a very simple operation. An external input 927 indicating roll axis attitude is used to generate a pointer value which tells which pixel is to be the first pixel in the line. Thus, line formatter 926 provides electronic roll correction by a very simple buffering operation.

Values for missing pixels (at the butt between the two CCD chips) are generated by averaging the values from the adjacent "live" pixels.

Image Rectification

"Image rectification" is the process of removing the component of distortion which is caused by unequal in-track and cross-track ground sample distances. The purpose of image rectification is to ensure that each pixel corresponds to an area on the ground which has approximately equal dimensions in the in-track and cross-track directions.

Image rectification is accomplished (in logic not shown in FIG. 2) by generation of a video line rate governed by the following relationship:

$$R = (K \cdot F \cdot V)/(N \cdot P \cdot H),$$

where
R = the video line rate
F = sensor focal length
P = pitch of CCD pixel
N = implied pixel grouping integer (in the cross-track direction)
V = vehicle ground speed
H = vehicle altitude
K = (sine of the forward oblique depression angle)$^2$.
(Note that this value is 1 at nadir.)

The implied pixel grouping integer N is changed as needed to avoid violating the maximum system data rate and/or maximum sensor line rate limits.

Bandwidth Limiting

The implied pixel grouping integer N is determined by the maximum system data rate and/or maximum sensor line rate. In the presently preferred embodiment, the maximum sensor line rate is 2000 lines per second. As long as neither of these factors is limiting, the grouping integer N is left equal to 1 (i.e. the line rate is not reduced). However, when one of these limits is reached (for example, when V/H increases during flight), N is increased to a higher integer. This means that pixel grouping takes place; for example, when N increases from 1 to 2, the line rate is halved. Preferably the number of pixels per line is also reduced at the same rate, by combining pixel values. (This means that the net data rate is reduced by $(N-1)^2/N^2$ when N is increased from $N-1$.)

Alternatively, the parameters for line and pixel grouping may be decoupled. This would mean that retranslation of the output still would be relatively simple (since image pixels would be combined into rectangular blocks), but less drastic steps in data rates would be available.

The rules defining the pixel grouping imager have hysteresis built in. That is, the break points used to define pixel grouping boundaries are different under increasing V/H conditions and decreasing V/H conditions. This helps to avoid line rate jitter.

Data Output

In the presently preferred embodiment, the reconnaissance system is designed to be borne by an airplane, and the image data output is saved on a conventional multitrack digital magnetic tape recorder. However, in alternative embodiments an RF downlink (real-time or buffered) could be used instead. This might be particularly advantageous where other platforms (e.g. drones) are used for the reconnaissance mission.

As will be recognized by those skilled in the art, the innovative concepts described herein can be modified and varied over a tremendous range of applications, and accordingly their scope is not limited except by the claims.

| $n_d = 1.74400$ | $v_d = 44.72$ | $n_f - n_c = 0.016638$ | | | |
|---|---|---|---|---|---|
| $n_e = 1.74796$ | $v_e = 44.44$ | $n_f - n_c = 0.016832$ | | | |

| Refractive Indices | | | Relative Partial Dispersion | | Internal Transmittance $\tau_i$ | | |
|---|---|---|---|---|---|---|---|
| | $\lambda$[nm] | | $P_{s,t}$ | 0.2444 | $\lambda$[nm] | $\tau_i$(5 mm) | $\tau_i$(25 mm) |
| $n_{2325.4}$ | 2325.4 | 1.70607 | $P_{c,s}$ | 0.5047 | 2325.4 | 0.91 | 0.64 |
| $n_{1970.1}$ | 1970.1 | 1.71184 | $P_{d,c}$ | 0.2978 | 1970.1 | 0.978 | 0.90 |
| $n_{1529.6}$ | 1529.6 | 1.71824 | $P_{e,d}$ | 0.2377 | 1529.6 | 0.997 | 0.986 |
| $n_{1060.0}$ | 1060.0 | 1.72565 | $P_{g,f}$ | 0.5656 | 1060.0 | 0.997 | 0.996 |
| $n_t$ | 1014.0 | 1.72658 | $P_{i,h}$ | 0.8459 | 700 | 0.998 | 0.990 |
| $n_s$ | 852.1 | 1.73065 | | | 660 | 0.998 | 0.990 |
| $n_r$ | 706.5 | 1.73628 | $P'_{s,t}$ | 0.2416 | 620 | 0.998 | 0.988 |
| $n_C$ | 656.3 | 1.73905 | $P'_{c,s}$ | 0.5453 | 580 | 0.998 | 0.988 |
| $n_{c'}$ | 643.8 | 1.73983 | $P'_{d,c'}$ | 0.2480 | 546.1 | 0.997 | 0.985 |
| $n_{632.8}$ | 632.8 | 1.74056 | $P'_{e,d}$ | 0.2350 | 500 | 0.995 | 0.977 |
| $n_D$ | 589.3 | 1.74386 | $P'_{g,f}$ | 0.5012 | 460 | 0.991 | 0.955 |
| $n_d$ | 587.6 | 1.74400 | $P'_{i,h}$ | 0.8361 | 435.8 | 0.987 | 0.94 |
| $n_e$ | 546.1 | 1.74796 | | | 420 | 0.983 | 0.92 |
| $n_f$ | 486.1 | 1.75568 | Other Properties | | 404.7 | 0.972 | 0.87 |
| $n_{f'}$ | 480.0 | 1.75666 | $\alpha_{-30/+70^\circ C}[10^{-6}/K]$ | 8.1 | 400 | 0.968 | 0.85 |
| $n_g$ | 435.8 | 1.76510 | $\beta_{20/300^\circ C}[10^{-6}/K]$ | 9.2 | 390 | 0.95 | 0.77 |
| $n_h$ | 404.7 | 1.77309 | Tg[°C.] | 644 | 380 | 0.91 | 0.64 |

-continued

| | | | | | | | | |
|---|---|---|---|---|---|---|---|---|
| $n_i$ | 365.0 | 1.78717 | $T_{107.6}$[°C.] | | 740 | 370 | 0.84 | 0.43 |
| | | | $c_p$[J/g.K] | | | 365.0 | 0.78 | 0.30 |
| | | | $\lambda$[W/m.K] | | | 350 | 0.46 | 0.02 |
| | | | | | | 334.1 | 0.03 | |
| | | | $\rho$[g/cm$^3$] | | 4.34 | 320 | | |
| | Constants of Dispersion Formula | | $E$[$10^3$N/mm$^2$] | | 93 | 310 | | |
| $A_0$ | 2.9673787 | | $\mu$ | | 0.289 | 300 | | |
| $A_1$ | $-1.0978767 \cdot 10^{-2}$ | | HK | | 480 | 290 | | |
| $A_2$ | $2.5088607 \cdot 10^{-2}$ | | | | | 280 | | |
| $A_3$ | $6.3171596 \cdot 10^{-4}$ | | B | | 1 | | | |
| $A_4$ | $-7.5645417 \cdot 10^{-6}$ | | CR | | 2 | | Remarks | |
| $A_5$ | $2.3202213 \cdot 10^{-6}$ | | FR | | 3 | | | |
| | | | SR | | 5.2 | | | |
| | | | AR | | 1.2 | | | |

| Deviation of Relative Partial Dispersions $\Delta P$ from the "Normal Line" | | Temperature Coefficients of Refractive Index | | | | | | | | | |
|---|---|---|---|---|---|---|---|---|---|---|---|
| | | | $\Delta n/\Delta T_{relative}$[$10^{-6}$/K] | | | | | $\Delta n/\Delta T_{absolute}$[$10^{-6}$/k] | | | |
| $\Delta P_{c,t}$ | $-0.0080$ | [°C.] | 1060.0 | s | C' | e | g | 1060.0 | s | C' | e | g |
| $\Delta P_{c,s}$ | $-0.0024$ | $-40/-20$ | 0.1 | 0.1 | 0.2 | 0.7 | 2.0 | $-2.6$ | $-2.5$ | $-2.2$ | $-1.7$ | $-0.4$ |
| $\Delta P_{f,e}$ | $-0.0005$ | $-20/0$ | 0.1 | 0.2 | 0.3 | 0.8 | 2.1 | $-2.1$ | $-2.0$ | $-1.7$ | $-1.2$ | 0.0 |
| $\Delta P_{g,f}$ | $-0.0029$ | $0/+20$ | 0.2 | 0.3 | 0.4 | 0.9 | 2.2 | $-1.7$ | $-1.6$ | $-1.3$ | $-0.8$ | 0.4 |
| $\Delta P_{i,g}$ | $-0.0226$ | $+20/+40$ | 0.3 | 0.4 | 0.6 | 1.1 | 2.4 | $-1.4$ | $-1.3$ | $-1.0$ | $-0.5$ | 0.8 |
| | | $+40/+60$ | 0.4 | 0.5 | 0.7 | 1.2 | 2.5 | $-1.1$ | $-1.0$ | $-0.7$ | $-0.2$ | 1.1 |
| | | $+60/+80$ | 0.4 | 0.5 | 0.8 | 1.3 | 2.6 | $-0.8$ | $-0.7$ | $-0.4$ | 0.1 | 1.4 |

| Refractive Index | $n_d$ | 1.84666 1.846658 | $\dfrac{n_d - 1}{n_F - n_c} = \nu_d$ | 23.9 23.88 | Dispersion $n_F - n_c$ | 0.03545 0.035448 |
|---|---|---|---|---|---|---|
| Refractive Index | $n_e$ | 1.85501 | $\dfrac{n_e - 1}{n_{F'} - n_{c'}} = \nu_e$ | 23.70 | Dispersion $n_{F'} - n_{c'}$ | 0.036078 |

| Refractive Indices | | Relative Partial Dispersions | | | | Internal Transmittance | |
|---|---|---|---|---|---|---|---|
| $n_t$ (1014.0) | 1.81348 | $n_c - n_t$ $\theta_{c,t}$ | $n_c - n_{A'}$ $\theta_{c,A'}$ | $n_d - n_c$ $\theta_{d,c}$ | $n_e - n_c$ $\theta_{e,c}$ | $\lambda$(nm) | $\tau$10 mm |
| $n_{A'}$ (768.2) | 1.82583 | 0.023047 0.6502 | 0.010694 0.3017 | 0.010130 0.2858 | 0.018484 0.5214 | 280 290 | |
| $n_b$ (706.5) | 1.83106 | $n_g - n_d$ $\theta_{g,d}$ | $n_g - n_F$ $\theta_{g,F}$ | $n_h - n_g$ $\theta_{h,g}$ | $n_t - n_g$ $\theta_{i,g}$ | 300 | |
| $n_c$ (656.3) | 1.83653 | 0.047154 1.3302 | 0.021836 0.6160 | 0.019685 0.5553 | — — | 310 320 | |
| $n_{c'}$ (643.8) | 1.83810 | $n_{c'} - n_t$ $\theta'_{c',t}$ | $n_e - n_{c'}$ $\theta'_{e,c'}$ | $n_F - n_e$ $\theta'_{F,e}$ | $n_t - n_F$ $\theta'_{i,F}$ | 330 | |
| $n_D$ (589.3) | 1.84635 | 0.024617 0.6823 | 0.016914 0.4688 | 0.019164 0.5312 | — — | 340 350 | |
| | | Deviation of Relative Partial Dispersions $\Delta\theta$ from "Normal" | | | | | |
| $n_d$ (587.6) | 1.84666 | $\Delta\theta_{c,t}$ $-0.0085$ | $\Delta\theta_{c,A'}$ $-0.0031$ | $\Delta\theta_{g,d}$ 0.0153 | $\Delta\theta_{g,F}$ 0.0133 | $\Delta\theta_{i,g}$ — | 360 370 | 0.01 0.19 |
| | | Mechanical Properties | | Thermal Properties | | | |
| $n_e$ (546.1) | 1.85501 | Young's Modulus $E\left(\dfrac{kgw}{mm^2}\right)$ | 5290 | Transformation Temperature | $T_g$ (°C.) | 447 | 380 | 0.46 |
| $n_F$ (486.1) | 1.87198 | Rigidity Modulus $G\left(\dfrac{kgw}{mm^2}\right)$ | 2110 | Yield Point | $A_t$ (°C.) | 466 | 390 | 0.65 |
| $n_{F'}$ (480.0) | 1.87418 | Poisson's Ratio $\sigma$ | 0.251 | Softening Point | $S_p$ (°C.) | 512 | 400 | 0.78 |
| $n_g$ (435.8) | 1.89381 | Knoop Hardness Group | 3 | Expansion Coefficient | $\left(\begin{array}{c}-30\\+70°\text{ C.}\end{array}\right)$ | 78 | 420 | 0.909 |
| $n_{G'}$ (434.0) | 1.89478 | Abrasion | 257 | ($\alpha \times 10^7$) | $\left(\begin{array}{c}+100\\+300°\text{ C.}\end{array}\right)$ | 87 | 440 | 0.958 |
| | | Chemical Properties | | Other Properties | | | |
| $n_h$ (404.7) | 1.91350 | Water Resistance (Powder) Group | 5 | Bubble Quality Group | 2 | | 460 | 0.979 |
| $n_i$ (365.0) | — | Acid Resistance (Powder) Group | 3~4 | Coloring | 44/37 | | 480 | 0.989 |
| | | Acid Resistance (Surface) Group | 5c | Specific Gravity | 5.53 | | 500 | 0.994 |

-continued

| | | Weathering Resistance (Surface) Group | 3 | Remarks | | | | 550 | 0.998 |
| | | | | | | | | 600 | 0.998 |
| | | | | | | | | 650 | 0.998 |
| | | | | | | | | 700 | 0.999 |

| | | | Temperature Coefficients of Refractive Index | | | | | | | | |
|---|---|---|---|---|---|---|---|---|---|---|---|
| | Constants of | Range of Temperature | dn/dt | | relative $\times 10^6$/°C. | | | dn/dt | | absolute $\times 10^6$ °C. | |
| | Dispersion Formula | (°C.) | c' | D | e | F' | g | c' | D | e | F | g |
| $A_0$ | 3.2498918 | −40~−20 | 10.1 | 11.1 | 12.2 | 13.7 | 18.0 | 7.6 | 8.6 | 9.7 | 11.2 | 15.4 |
| $A_1$ | $-1.0466366 \cdot 10^{-2}$ | −20~0 | 10.4 | 11.4 | 12.6 | 14.5 | 18.6 | 8.3 | 9.3 | 10.4 | 12.3 | 16.4 |
| $A_2$ | $4.8000686 \cdot 10^{-2}$ | 0~20 | 10.8 | 11.9 | 13.0 | 15.4 | 19.3 | 9.0 | 10.0 | 11.2 | 13.5 | 17.4 |
| $A_3$ | $3.1859922 \cdot 10^{-3}$ | 20~40 | 11.3 | 12.4 | 13.6 | 16.3 | 20.1 | 9.7 | 10.8 | 12.0 | 14.7 | 18.5 |
| $A_4$ | $-1.5447369 \cdot 10^{-4}$ | 40~60 | 11.8 | 12.9 | 14.1 | 17.3 | 21.0 | 10.3 | 11.5 | 12.7 | 15.8 | 19.5 |
| $A_5$ | $2.6258671 \cdot 10^{-5}$ | 60~80 | 12.3 | 13.4 | 14.8 | 18.3 | 21.8 | 11.0 | 12.2 | 13.5 | 17.0 | 20.5 |

| $n_d = 1.70585$ | $v_d = 30.30$ | | $n_F - n_C = 0.023295$ | | | | |
|---|---|---|---|---|---|---|---|
| $n_e = 1.71135$ | $v_e = 30.07$ | | $n_{F'} - n_{C'} = 0.023657$ | | | | |
| Refractive Indices | | | Relative Partial Dispersion | | Internal Transmittance $T_i$ | | |
| $\lambda$[nm] | | | $P_{s,t}$ | 0.2223 | $\lambda$[nm] | $T_i$(5 mm) | $T_i$(25 mm) |
| $n_{2325.4}$ | 2325.4 | | $P_{C,s}$ | 0.4766 | 2325.4 | 0.950 | 0.77 |
| $n_{1970.1}$ | 1970.1 | | $P_{d,C}$ | 0.2903 | 1970.1 | 0.988 | 0.94 |
| $n_{1529.6}$ | 1529.6 | | $P_{e,d}$ | 0.2362 | 1529.6 | 0.999 | 0.995 |
| $n_{1060.0}$ | 1060.0 | 1.68164 | $P_{g,F}$ | 0.6006 | 1060.0 | 0.999 | 0.995 |
| $n_t$ | 1014.0 | 1.68281 | $P_{i,h}$ | | 700 | 0.999 | 0.993 |
| $n_s$ | 852.1 | 1.68798 | | | 660 | 0.997 | 0.985 |
| $n_r$ | 706.5 | 1.69538 | $P'_{s,t}$ | 0.2189 | 620 | 0.997 | 0.987 |
| $n_C$ | 656.3 | 1.69909 | $P'_{C,s}$ | 0.5140 | 580 | 0.998 | 0.989 |
| $n_{C'}$ | 643.8 | 1.70014 | $P'_{d,C}$ | 0.2412 | 546.1 | 0.996 | 0.980 |
| $n_{632.8}$ | 632.8 | 1.70114 | $P'_{e,d}$ | 0.2326 | 500 | 0.994 | 0.970 |
| $n_D$ | 589.3 | 1.70565 | $P'_{g,F}$ | 0.5314 | 460 | 0.988 | 0.94 |
| $n_d$ | 587.6 | 1.70585 | $P'_{i,h}$ | | 435.8 | 0.979 | 0.90 |
| $n_e$ | 546.1 | 1.71135 | | | 420 | 0.970 | 0.86 |
| $n_F$ | 486.1 | 1.72238 | Other Properties | | 404.7 | 0.94 | 0.75 |
| $n_{F'}$ | 480.0 | 1.72380 | $\alpha - 30/+70$° C. $[10^{-6}/K]$ | 8.5 | 400 | 0.93 | 0.71 |
| $n_g$ | 435.8 | 1.73637 | $\alpha 20/300$° C. $[10^{-6}/K]$ | 9.7 | 390 | 0.88 | 0.54 |
| $n_h$ | 404.7 | 1.74882 | Tg [°C.] | 578 | 380 | 0.79 | 0.30 |
| $n_i$ | 365.0 | | $T_{107.6}$ [°C.] | 666 | 370 | 0.55 | 0.05 |
| | | | $C_p$[J/g · K] | | 365.0 | 0.35 | |
| | | | $\lambda$[W/m · K] | | 350 | | |
| | | | | | 334.1 | | |
| Constants of Dispersion Formula | | | $\rho$[g/cm$^3$] | 3.00 | 320 | | |
| $A_0$ | 2.8125953 | | $E[10^3$ N/mm$^2]$ | 93 | 310 | | |
| $A_1$ | $-1.1916007 \cdot 10^{-2}$ | | $\mu$ | 0.250 | 300 | | |
| $A_2$ | $3.1041260 \cdot 10^{-2}$ | | HK | 500 | 290 | | |
| $A_3$ | $1.4083879 \cdot 10^{-3}$ | | | | 280 | | |
| $A_4$ | $-4.4978076 \cdot 10^{-5}$ | | B | 1-2 | | | |
| $A_5$ | $1.1419083 \cdot 10^{-5}$ | | CR | 1 | | Remarks | |
| | | | FR | 0 | | | |
| | | | SR | 1-2 | | | |
| | | | AR | 1.2 | | | |
| Deviation of Relative Partial Dispersions $\Delta$ P from the "Normal Line" | | | Temperature Coefficients of Refractive Index | | | | |
| | | | | $\Delta n/\Delta T_{relative}$ $[10^{-6}/K]$ | | $\Delta n/\Delta T_{absolute}$ $[10^{-6}/K]$ | |
| $\Delta P_{C,t}$ | 0.0101 | | [°C.] | 1060.0 s C' e g | | 1060.0 s C' e g | |
| $\Delta P_{C,s}$ | 0.0031 | | −40/−20 | | | | |
| $\Delta P_{F,e}$ | 0.0010 | | −20/0 | 0.9 1.1 1.5 2.3 4.3 | | −1.0 −0.8 −0.5 0.3 2.2 | |
| $\Delta P_{g,F}$ | 0.0078 | | 0/+20 | 1.0 1.2 1.7 2.5 4.7 | | −0.7 −0.5 0.0 0.8 2.9 | |
| $\Delta P_{i,g}$ | | | +20/+40 | 1.1 1.4 1.9 2.7 5.1 | | −0.3 −0.1 0.4 1.2 3.6 | |
| | | | +40/+60 | 1.3 1.5 2.1 3.0 5.5 | | 0.0 0.2 0.8 1.7 4.1 | |
| | | | +60/+80 | 1.4 1.7 2.3 3.2 6.0 | | 0.3 0.6 1.1 2.0 4.8 | |

| $n_d = 1.69350$ | $v_d = 53.33$ | | $n_F - n_C = 0.013004$ | | | | |
|---|---|---|---|---|---|---|---|
| $n_e = 1.69660$ | $v_e = 53.05$ | | $n_{F'} - n_{C'} = 0.013130$ | | | | |
| Refractive Indices | | | Relative Partial Dispersion | | Internal Transmittance $\tau_i$ | | |
| $\lambda$[nm] | | | $P_{s,t}$ | 0.2617 | $\lambda$[nm] | $\tau_i$(5 mm) | $\tau_i$(25 mm) |
| $n_{2325.4}$ | 2325.4 | 1.66047 | $P_{C,s}$ | 0.5221 | 2325.4 | 0.87 | 0.49 |
| $n_{1970.1}$ | 1970.1 | 1.66601 | $P_{d,C}$ | 0.3016 | 1970.1 | 0.983 | 0.92 |
| $n_{1529.6}$ | 1529.6 | 1.67200 | $P_{e,d}$ | 0.2382 | 1529.6 | 0.997 | 0.985 |
| $n_{1060.0}$ | 1060.0 | 1.67859 | $P_{g,F}$ | 0.5511 | 1060.0 | 0.998 | 0.990 |
| $n_t$ | 1014.0 | 1.67939 | $P_{i,h}$ | 0.7898 | 700 | 0.998 | 0.992 |
| $n_s$ | 852.1 | 1.68279 | | | 660 | 0.999 | 0.993 |
| $n_r$ | 706.5 | 1.68737 | $P'_{s,t}$ | 0.2592 | 620 | 0.999 | 0.994 |

-continued

| | | | | | | | |
|---|---|---|---|---|---|---|---|
| $n_C$ | 656.3 | 1.68958 | $P'_{C,s}$ | 0.5644 | 580 | 0.999 | 0.995 |
| $n_{C'}$ | 643.8 | 1.69020 | $P'_{d,C}$ | 0.2513 | 546.1 | 0.999 | 0.995 |
| $n_{632.8}$ | 632.8 | 1.69078 | $P'_{e,d}$ | 0.2359 | 500 | 0.998 | 0.991 |
| $n_D$ | 589.3 | 1.69339 | $P'_{g,F}$ | 0.4888 | 460 | 0.995 | 0.974 |
| $n_d$ | 587.6 | 1.69350 | $P'_{i,h}$ | 0.7822 | 435.8 | 0.991 | 0.956 |
| $n_e$ | 546.1 | 1.69660 | | | 420 | 0.990 | 0.950 |
| $n_F$ | 486.1 | 1.70258 | Other Properties | | 404.7 | 0.988 | 0.94 |
| $n_{F'}$ | 480.0 | 1.70333 | $\alpha_{-30/+70°C}[10^{-6}/K]$ | 8.4 | 400 | 0.986 | 0.93 |
| $n_g$ | 435.8 | 1.70975 | $\alpha_{20/300°C}[10^{-6}/K]$ | 9.5 | 390 | 0.981 | 0.91 |
| $n_h$ | 404.7 | 1.71573 | $T_g[°C]$ | 614 | 380 | 0.973 | 0.87 |
| $n_i$ | 365.0 | 1.72600 | $T_{107.6}[°C]$ | 718 | 370 | 0.950 | 0.77 |
| | | | $C_p[J/g \cdot K]$ | | 365.0 | 0.92 | 0.67 |
| | | | $\lambda[W/m \cdot K]$ | | 350 | 0.81 | 0.35 |
| | | | | | 334.1 | 0.63 | 0.10 |
| | | | $\rho[g/cm^3]$ | 4.24 | 320 | 0.36 | |
| Constants of Dispersion Formula | | | $E[10^3 N/mm^2]$ | 87 | 310 | 0.19 | |
| $A_0$ | 2.8115119 | | $\mu$ | 0.289 | 300 | 0.07 | |
| $A_1$ | $-1.0386717 \cdot 10^{-2}$ | | HK | 470 | 290 | | |
| $A_2$ | $1.9734379 \cdot 10^{-2}$ | | | | 280 | | |
| $A_3$ | $3.2856524 \cdot 10^{-4}$ | | B | 1 | | | |
| $A_4$ | $3.2051557 \cdot 10^{-6}$ | | CR | 4(2.2) | | Remarks | |
| $A_5$ | $3.0925067 \cdot 10^{-7}$ | | FR | 2 | | | |
| | | | SR | 53(30) | | | |
| | | | AR | 3.2 | | | |

| Deviation of Relative Partial Dispersions $\Delta P$ from the "Normal Line" | | Temperature Coefficients of Refractive Index | | | | | | | | | |
|---|---|---|---|---|---|---|---|---|---|---|---|
| | | | $\Delta n/\Delta T_{relative}[10^{-6}/K]$ | | | | | $\Delta n/\Delta T_{absolute}[10^{-6}/K]$ | | | |
| $\Delta P_{C,t}$ | $-0.0142$ | [°C] | 1060.0 | s | C' | e | g | 1060.0 | s | C' | e | g |
| $\Delta P_{C,s}$ | $-0.0051$ | $-40/-20$ | | | | | | | | | | |
| $\Delta P_{F,e}$ | $-0.0002$ | $-20/0$ | | | | | | | | | | |
| $\Delta P_{g,F}$ | $-0.0029$ | $0/+20$ | | | | | | | | | | |
| $\Delta P_{i,g}$ | $-0.0270$ | $+20/+40$ | $-0.8$ | $-0.7$ | $-0.5$ | $-0.3$ | $-0.6$ | $-2.3$ | $-2.2$ | $-2.0$ | $-1.6$ | $-1.0$ |
| | | $+40/+60$ | $-0.8$ | $-0.7$ | $-0.5$ | $-0.3$ | $-0.6$ | $-2.1$ | $-2.0$ | $-1.8$ | $-1.4$ | $-0.8$ |
| | | $+60/+80$ | $-0.8$ | $-0.7$ | $-0.5$ | $-0.3$ | $-0.6$ | $-2.0$ | $-1.9$ | $-1.7$ | $-1.3$ | $-0.7$ |

$n_d = 1.48749 \quad V_d = 70.41 \quad n_F - n_C = 0.006924$
$n_e = 1.48914 \quad V_e = 70.22 \quad n_{F'} - n_{C'} = 0.006966$

| Refractive Indices | | | Relative Partial Dispersion | | Internal Transmittance $\tau_i$ | | |
|---|---|---|---|---|---|---|---|
| | $\lambda$ [nm] | | $P_{s,t}$ | 0.325 | $\lambda$ [nm] | $\tau_i$ (5 mm) | $\tau_i$ (25 mm) |
| $n_{2325.4}$ | 2325.4 | 1.46190 | $P_{C,s}$ | 0.574 | 2325.4 | 0.91 | 0.64 |
| $n_{1970.1}$ | 1970.1 | 1.46744 | $P_{d,C}$ | 0.310 | 1970.1 | 0.986 | 0.93 |
| $n_{1529.6}$ | 1529.6 | 1.47315 | $P_{e,d}$ | 0.239 | 1529.6 | 0.993 | 0.965 |
| $n_{1060.0}$ | 1060.0 | 1.47856 | $P_{g,F}$ | 0.529 | 1060.0 | 0.999 | 0.996 |
| $n_t$ | 1014.0 | 1.47913 | $P_{i,h}$ | 0.732 | 700 | 0.999 | 0.996 |
| $n_s$ | 852.1 | 1.48137 | | | 660 | 0.998 | 0.989 |
| $n_r$ | 706.5 | 1.48410 | $P'_{s,t}$ | 0.323 | 620 | 0.998 | 0.988 |
| $n_C$ | 656.3 | 1.48535 | $P'_{C,s}$ | 0.620 | 580 | 0.998 | 0.988 |
| $n_{C'}$ | 643.8 | 1.48569 | $P'_{d,C}$ | 0.258 | 546.1 | 0.998 | 0.988 |
| $n_{632.8}$ | 632.8 | 1.48601 | $P'_{e,d}$ | 0.237 | 500 | 0.997 | 0.987 |
| $n_D$ | 589.3 | 1.48743 | $P'_{g,F}$ | 0.470 | 460 | 0.997 | 0.986 |
| $n_d$ | 587.6 | 1.48749 | $P'_{i,h}$ | 0.728 | 435.8 | 0.997 | 0.987 |
| $n_e$ | 546.1 | 1.48914 | | | 420 | 0.998 | 0.992 |
| $n_F$ | 486.1 | 11.49227 | Other Properties | | 404.7 | 0.998 | 0.992 |
| $n_{F'}$ | 480.0 | 1.49266 | $\alpha_{-30/+70°C}[10^{-6}/K]$ | 9.2 | 400 | 0.998 | 0.991 |
| $n_g$ | 435.8 | 1.49593 | $\alpha_{20/300°C}[10^{-6}/K]$ | 10.0 | 390 | 0.998 | 0.991 |
| $n_h$ | 404.7 | 1.49894 | $T_g[°C]$ | 464 | 380 | 0.998 | 0.991 |
| $n_i$ | 365.0 | 1.50401 | $T_{107.6}[°C]$ | 672 | 370 | 0.998 | 0.991 |
| | | | $C_p[J/g \cdot K]$ | 0.808 | 365.0 | 0.998 | 0.990 |
| | | | $\lambda[W/m \cdot K]$ | 0.925 | 350 | 0.998 | 0.988 |
| | | | | | 334.1 | 0.991 | 0.958 |
| | | | $\rho[g/cm^3]$ | 4.34 | 320 | 0.975 | 0.88 |
| Constants of Dispersion Formula | | | $E[10^3 N/mm^2]$ | 62 | 310 | 0.94 | 0.74 |
| $A_0$ | 2.1887621 | | $\mu$ | 0.205 | 300 | 0.86 | 0.46 |
| $A_1$ | $-9.5572007 \cdot 10^{-3}$ | | HK | 450 | 290 | 0.66 | 0.13 |
| $A_2$ | $8.9915232 \cdot 10^{-3}$ | | | | 280 | 0.38 | |
| $A_3$ | $1.4560516 \cdot 10^{-4}$ | | B | 1 | | | |
| $A_4$ | $-5.2843067 \cdot 10^{-6}$ | | CR | 2 | | Remarks | |
| $A_5$ | $3.4588010 \cdot 10^{-7}$ | | FR | 1 | | | |
| | | | SR | 4 | | | |
| | | | AR | 3.0 | | | |

| Deviation of Relative Partial Dispersions $\Delta P$ from the "Normal Line" | | Temperature Coefficients of Refractive Index | | | | | | | | | |
|---|---|---|---|---|---|---|---|---|---|---|---|
| | | | $\Delta n/\Delta T_{relative}[10^{-6}/K]$ | | | | | $\Delta n/\Delta T_{absolute}[10^{-6}/K]$ | | | |
| $\Delta P_{C,t}$ | 0.019 | [°C] | 1060.0 | s | C' | e | g | 1060.0 | s | C' | e | g |
| $\Delta P_{C,s}$ | 0.007 | $-40/-20$ | | | | | | | | | | |
| $\Delta P_{F,e}$ | 0.000 | $-20/0$ | $-1.9$ | $-1.9$ | $-1.8$ | $-1.6$ | $-1.4$ | $-3.6$ | $-3.6$ | $-3.5$ | $-3.3$ | $-3.2$ |

-continued

| | | | | | | | | | | | | |
|---|---|---|---|---|---|---|---|---|---|---|---|---|
| $\Delta P_{g,F}$ | 0.004 | 0/+20 | −1.8 | −1.7 | −1.6 | −1.4 | −1.1 | −3.2 | −3.2 | −3.1 | −2.9 | −2.6 |
| $\Delta P_{i,g}$ | 0.033 | +20/+40 | −1.7 | −1.6 | −1.5 | −1.3 | −0.9 | −2.9 | −2.9 | −2.8 | −2.6 | −2.2 |
| | | +40/+60 | −1.5 | −1.4 | −1.2 | −1.1 | −0.6 | −2.6 | −2.5 | −2.3 | −2.2 | −1.8 |
| | | +60/+80 | −1.4 | −1.3 | −1.1 | −1.1 | −0.5 | −2.4 | −2.3 | −2.1 | −2.1 | −1.5 |

$n_d = 1.80518 \quad v_d = 25.43 \quad n_F - n_C = 0.031660$
$n_e = 1.81265 \quad v_e = 25.24 \quad n_{F'} - n_{C'} = 0.032200$

| Refractive Indices | | | Relative Partial Dispersion | | Internal Transmittance $\tau_i$ | | |
|---|---|---|---|---|---|---|---|
| | $\lambda$[nm] | | $P_{s,t}$ | 0.2019 | $\lambda$[nm] | $\tau_i$(5 mm) | $\tau_i$(25 mm) |
| $n_{2325.4}$ | 2325.4 | 1.75306 | $P_{C,s}$ | 0.4580 | 2325.4 | 0.952 | 0.78 |
| $n_{1970.1}$ | 1970.1 | 1.75815 | $P_{d,C}$ | 0.2872 | 1970.1 | 0.986 | 0.93 |
| $n_{1529.6}$ | 1529.6 | 1.76447 | $P_{e,d}$ | 0.2359 | 1529.6 | 0.998 | 0.990 |
| $n_{1060.0}$ | 1060.0 | 1.77381 | $P_{g,F}$ | 0.6097 | 1060.0 | 0.999 | 0.995 |
| $n_t$ | 1014.0 | 1.77520 | $P_{i,h}$ | 1.0361 | 700 | 0.999 | 0.998 |
| $n_s$ | 852.1 | 1.78159 | | | 660 | 0.999 | 0.997 |
| $n_r$ | 706.5 | 1.79117 | $P'_{s,t}$ | 0.1985 | 620 | 0.999 | 0.997 |
| $n_C$ | 656.3 | 1.79609 | $P'_{C,s}$ | 0.4942 | 580 | 0.999 | 0.997 |
| $n_{C'}$ | 643.8 | 1.79750 | $P'_{d,C'}$ | 0.2385 | 546.1 | 0.999 | 0.995 |
| $n_{632.8}$ | 632.8 | 1.79883 | $P'_{e,d}$ | 0.2320 | 500 | 0.998 | 0.990 |
| $n_D$ | 589.3 | 1.80491 | $P'_{g,F}$ | 0.5389 | 460 | 0.994 | 0.970 |
| $n_d$ | 587.6 | 1.80518 | $P'_{i,h}$ | 1.0188 | 435.8 | 0.988 | 0.94 |
| $n_e$ | 546.1 | 1.81265 | | | 420 | 0.975 | 0.88 |
| $n_F$ | 486.1 | 1.82775 | Other Properties | | 404.7 | 0.950 | 0.77 |
| $n_{F'}$ | 480.0 | 1.82970 | $\alpha_{-30/+70^\circ C}[10^{-6}/K]$ | 8.1 | 400 | 0.94 | 0.73 |
| $n_g$ | 435.8 | 1.84705 | $\alpha_{20/300^\circ C}[10^{-6}/K]$ | 9.0 | 390 | 0.90 | 0.58 |
| $n_h$ | 404.7 | 1.86436 | Tg[°C] | 423 | 380 | 0.82 | 0.38 |
| $n_i$ | 365.0 | 1.89716 | $T_{107.6}$[°C] | 538 | 370 | 0.68 | 0.15 |
| | | | $C_p$ [J/g·K] | 0.389 | 365.0 | 0.55 | 0.05 |
| | | | $\lambda$[W/m·K] | 0.673 | 350 | 0.06 | |
| | | | | | 334.1 | | |
| | | | $\rho$[g/cm$^3$] | 5.18 | 320 | | |
| Constants of Dispersion Formula | | | E[10$^3$N/mm$^2$] | 56 | 310 | | |
| $A_0$ | 3.1195003 | | $\mu$ | 0.248 | 300 | | |
| $A_1$ | −1.0902580·10$^{-2}$ | | HK | 310 | 290 | | |
| $A_2$ | 4.1330651·10$^{-2}$ | | | | 280 | | |
| $A_3$ | 3.1800214·10$^{-3}$ | | B | 0-1 | | | |
| $A_4$ | −2.1953184·10$^{-4}$ | | CR | 2 | | Remarks | |
| $A_5$ | 2.6671014·10$^{-5}$ | | FR | 3-4 | | | |
| | | | SR | 52 | | | |
| | | | AR | 2.3 | | | |

| Deviation of Relative Partial Dispersions $\Delta P$ from the "Normal Line" | | Temperature Coefficients of Refractive Index | | | | | | | | | |
|---|---|---|---|---|---|---|---|---|---|---|---|
| | | | $\Delta n/\Delta T_{relative}$ [10$^{-6}$/K] | | | | | $\Delta n/\Delta T_{absolute}$ [10$^{-6}$/K] | | | |
| $\Delta P_{C,t}$ | −0.0058 | [°C] | 1060.0 | s | C' | e | g | 1060.0 | s | C' | e | g |
| $\Delta P_{C,s}$ | −0.0041 | −40/−20 | 6.7 | 7.4 | 9.2 | 10.7 | 15.3 | 4.5 | 5.2 | 6.8 | 8.2 | 12.8 |
| $\Delta P_{F,e}$ | 0.0018 | −20/0 | 6.7 | 7.4 | 9.2 | 10.7 | 15.8 | 4.9 | 5.5 | 7.1 | 8.6 | 13.6 |
| $\Delta P_{g,F}$ | 0.0087 | 0/+20 | 6.9 | 7.6 | 9.4 | 11.1 | 16.2 | 5.3 | 6.0 | 7.6 | 9.3 | 14.4 |
| $\Delta P_{i,g}$ | 0.0717 | +20/+40 | 7.2 | 7.9 | 9.7 | 11.6 | 16.9 | 5.8 | 6.5 | 8.2 | 10.0 | 15.3 |
| | | +40/+60 | 7.4 | 8.2 | 10.1 | 12.1 | 17.6 | 6.2 | 6.9 | 8.7 | 10.7 | 16.2 |
| | | +60/+80 | 7.6 | 8.3 | 10.3 | 12.3 | 18.1 | 6.5 | 7.3 | 9.1 | 11.1 | 16.8 |

$n_d = 1.65412 \quad v_d = 39.63 \quad n_f - n_c = 0.016507$
$n_e = 1.65804 \quad v_e = 39.40 \quad n_{f'} - n_{c'} = 0.016702$

| Refractive Indices | | | Relative Partial Dispersion | | Internal Transmittance $\tau_i$ | | |
|---|---|---|---|---|---|---|---|
| | $\lambda$[nm] | | $P_{s,t}$ | 0.2580 | $\lambda$[nm] | $\tau_i$(5 mm) | $\tau_i$(25 mm) |
| $n_{2325.4}$ | 2325.4 | 1.61108 | $P_{C,s}$ | 0.5118 | 2325.4 | 0.79 | 0.30 |
| $n_{1970.1}$ | 1970.1 | 1.61878 | $P_{d,C}$ | 0.2978 | 1970.1 | 0.966 | 0.84 |
| $n_{1529.6}$ | 1529.6 | 1.62692 | $P_{e,d}$ | 0.2374 | 1529.6 | 0.992 | 0.960 |
| $n_{1060.0}$ | 1060.0 | 1.63549 | $P_{g,f}$ | 0.5699 | 1060.0 | 0.999 | 0.995 |
| $n_t$ | 1014.0 | 1.63650 | $P_{i,h}$ | 0.8730 | 700 | 0.999 | 0.995 |
| $n_s$ | 852.1 | 1.64075 | | | 660 | 0.999 | 0.995 |
| $n_r$ | 706.5 | 1.64645 | $P'_{s,t}$ | 0.2550 | 620 | 0.999 | 0.995 |
| $n_C$ | 656.3 | 1.64920 | $P'_{C,s}$ | 0.5523 | 580 | 0.999 | 0.994 |
| $n_{C'}$ | 643.8 | 1.64998 | $P'_{d,C'}$ | 0.2478 | 546.1 | 0.998 | 0.992 |
| $n_{632.8}$ | 632.8 | 1.65071 | $P'_{e,d}$ | 0.2346 | 500 | 0.998 | 0.988 |
| $n_D$ | 589.3 | 1.65397 | $P'_{g,F}$ | 0.5051 | 460 | 0.995 | 0.976 |
| $n_d$ | 587.6 | 1.65412 | $P'_{i,h}$ | 0.8628 | 435.8 | 0.992 | 0.960 |
| $n_e$ | 546.1 | 1.65804 | | | 420 | 0.988 | 0.94 |
| $n_F$ | 486.1 | 1.66571 | Other Properties | | 404.7 | 0.981 | 0.91 |
| $n_{F'}$ | 480.0 | 1.66668 | $\alpha_{-30/+70^\circ C}[10^{-6}/K]$ | 4.5 | 400 | 0.979 | 0.90 |
| $n_g$ | 435.8 | 1.67512 | $\alpha_{20/300^\circ C}[10^{-6}/K]$ | 5.5 | 390 | 0.966 | 0.84 |
| $n_h$ | 404.7 | 1.68319 | Tg[°C] | 501 | 380 | 0.94 | 0.75 |
| $n_i$ | 365.0 | 1.69760 | $T_{107.6}$[°C] | | 370 | 0.90 | 0.60 |
| | | | $c_p$ [J/g·K] | | 365.0 | 0.87 | 0.49 |

-continued

| Constants of Dispersion Formula | | | | |
|---|---|---|---|---|
| $A_0$ | 2.6699840 | $\lambda[W/m \cdot K]$ | | 350 0.63 0.10 |
| | | | | 334.1 0.11 |
| | | $\rho[g/cm^3]$ | 3.46 | 320 |
| | | $E[10^3 N/mm^2]$ | 65 | 310 |
| $A_1$ | $-1.3941585 \cdot 10^{-2}$ | $\mu$ | 0.275 | 300 |
| $A_2$ | $2.2384056 \cdot 10^{-2}$ | HK | 410 | 290 |
| $A_3$ | $7.4780873 \cdot 10^{-4}$ | | | 280 |
| $A_4$ | $-1.7341165 \cdot 10^{-5}$ | B | 0-1 | |
| $A_5$ | $3.4427318 \cdot 10^{-6}$ | CR | 3 | Remarks |
| | | FR | 2 | |
| | | SR | 52 | |
| | | AR | 4.2 | |

Deviation of Relative Partial dispersion $\Delta P$ from the "Normal Line"

Temperature Coefficients of Refractive Index

| | | | $\Delta n/\Delta T_{relative}[10^{-6}/K]$ | | | | $\Delta n/\Delta T_{absolute}[10^{-6}/K]$ | | | |
|---|---|---|---|---|---|---|---|---|---|---|
| $\Delta P_{C,t}$ | 0.0368 | [°C.] | 1060.0 | s | C' | e | g | 1060.0 | s | C' | e | g |
| $\Delta P_{C,s}$ | 0.0166 | $-40/-20$ | | | | | | 2.4 | 2.6 | 3.0 | 3.4 | 4.5 |
| $\Delta P_{F,e}$ | $-0.0028$ | $-20/0$ | 4.5 | 4.7 | 5.2 | 5.7 | 6.9 | 2.7 | 3.3 | 3.8 | 4.9 | |
| $\Delta P_{g,F}$ | $-0.0072$ | $0/+20$ | 4.6 | 4.8 | 5.3 | 5.8 | 7.1 | 3.0 | 3.2 | 3.7 | 4.2 | 5.4 |
| $\Delta P_{i,g}$ | $-0.0298$ | $+20/+40$ | 4.7 | 5.0 | 5.5 | 6.0 | 7.3 | 3.4 | 3.6 | 4.1 | 4.6 | 5.8 |
| | | $+40/+60$ | 4.9 | 5.2 | 5.7 | 6.3 | 7.6 | 3.7 | 4.0 | 4.5 | 5.0 | 6.3 |
| | | $+60/+80$ | 5.2 | 5.4 | 6.0 | 6.5 | 7.9 | 4.1 | 4.3 | 4.9 | 5.4 | 6.8 |

---

$n_d = 1.87800$  $v_d = 38.07$  $n_F - 0.023061$
$n_e = 1.88347$  $v_e = 37.83$  $n_F = 0.023351$

| Refractive Indices | | | Relative Partial Dispersion | | Internal Transmittance $\tau_i$ | | |
|---|---|---|---|---|---|---|---|
| | $\lambda[nm]$ | | | | $\lambda[nm]$ | $\tau_i(5 mm)$ | $\tau_i(25 mm)$ |
| $n_{2325.4}$ | 2325.4 | 1.82691 | $P_{s,t}$ | 0.2389 | | | |
| $n_{1970.1}$ | 1970.1 | 1.83456 | $P_{C,s}$ | 0.4976 | 2325.4 | 0.91 | 0.63 |
| $n_{1529.6}$ | 1529.6 | 1.84302 | $P_{d,C}$ | 0.2960 | 1970.1 | 0.985 | 0.93 |
| $n_{1060.0}$ | 1060.0 | 1.85293 | $P_{e,d}$ | 0.2373 | 1529.6 | 0.997 | 0.988 |
| $n_t$ | 1014.0 | 1.85419 | $P_{g,F}$ | 0.5735 | 1060.0 | 0.999 | 0.995 |
| $n_s$ | 852.1 | 1.85970 | $P_{i,h}$ | 0.8757 | 700 | 0.998 | 0.992 |
| $n_r$ | 706.5 | 1.86738 | | | 660 | 0.997 | 0.988 |
| $n_C$ | 656.3 | 1.87118 | $P'_{s,t}$ | 0.2360 | 620 | 0.996 | 0.983 |
| $n_C$ | 643.8 | 1.87225 | $P'_{C,s}$ | 0.5375 | 580 | 0.995 | 0.961 |
| $n_{632.8}$ | 632.8 | 1.87326 | $P'_{d,C}$ | 0.2463 | 246.1 | 0.994 | 0.970 |
| $n_D$ | 589.3 | 1.87780 | $P'_{e,d}$ | 0.2344 | 500 | 0.990 | 0.950 |
| $n_d$ | 587.6 | 1.87800 | $P'_{g,F}$ | 0.5080 | 460 | 0.979 | 0.90 |
| $n_e$ | 546.1 | 1.88347 | $P'_{i,h}$ | 0.8648 | 435.8 | 0.970 | 0.86 |
| $n_F$ | 486.1 | 1.89424 | | | 420 | 0.958 | 0.81 |
| $n_F$ | 480.0 | 1.89560 | Other Properties | | 404.7 | 0.94 | 0.74 |
| $n_g$ | 435.8 | 1.90746 | $\alpha_{-30/+70°C}[10^{-6}/K]$ | 6.5 | 400 | 0.93 | 0.71 |
| $n_h$ | 404.7 | 1.91881 | $\alpha_{20/300°C}[10^{-6}/K]$ | 7.2 | 390 | 0.91 | 0.63 |
| $n_i$ | 365.0 | 1.93900 | $T_g[°C.]$ | 671 | 380 | 0.87 | 0.51 |
| | | | $T_{10}7.6[°C.]$ | 753 | 370 | 0.81 | 0.36 |
| | | | $C_p[J/g \cdot K]$ | | 365.0 | 0.77 | 0.27 |
| | | | $\lambda[W/m \cdot K]$ | | 350 | 0.57 | 0.06 |
| | | | | | 334.1 | 0.26 | |
| | | | $\rho[g/cm^3]$ | 4.75 | 320 | | |

| Constants of Dispersion Formula | | | | |
|---|---|---|---|---|
| | | $E[10^3 N/mm^2]$ | 126 | 310 |
| $A_0$ | 3.4174343 | | | |
| $A_1$ | $-1.5504887 \cdot 10^{-2}$ | $\mu$ | 0.293 | 300 |
| $A_2$ | 3.6536079 | HK | 650 | 290 |
| $A_3$ | $1.0424971 \cdot 10^{-3}$ | | | 280 |
| $A_4$ | $-1.8067825 \cdot 10^{-6}$ | B | 0-1 | |
| $A_5$ | $3.8393637 \cdot 10^{-6}$ | CR | 2 | Remarks |
| | | FR | 0 | |
| | | SR | 3 | |
| | | AR | 1.0 | |

Deviation of Relative Partial Dispersions $\Delta P$ from the "Normal Line"

Temperature Coefficients of Refractive Index

| | | | $\Delta n/\Delta T_{relative}[10^{-6}/K]$ | | | | | $\Delta n/\Delta T_{absolute}[10^{-6}/K]$ | | | | |
|---|---|---|---|---|---|---|---|---|---|---|---|---|
| $\Delta P_{C,t}$ | 0.0109 | [°C.] | 1060.0 | s | C' | e | g | 1060.0 | s | C' | e | g |
| $\Delta P_{C,s}$ | 0.0060 | $-40/-20$ | 3.8 | 4.1 | 4.7 | 5.4 | 7.0 | 1.5 | 1.7 | 2.2 | 2.8 | 4.4 |
| $\Delta P_{F,e}$ | $-0.0018$ | $-20/0$ | 3.8 | 4.1 | 4.7 | 5.4 | 7.1 | 1.8 | 2.0 | 2.5 | 3.2 | 4.8 |
| $\Delta P_{g,F}$ | $-0.0062$ | $0/+20$ | 3.8 | 4.0 | 4.7 | 5.4 | 7.2 | 2.1 | 2.3 | 2.9 | 3.6 | 5.3 |
| $\Delta P_{i,g}$ | $-0.0372$ | $+20/+40$ | 3.8 | 4.1 | 4.8 | 5.6 | 7.4 | 2.3 | 2.6 | 3.2 | 3.9 | 5.7 |
| | | $+40/+60$ | 4.0 | 4.3 | 5.0 | 5.9 | 7.8 | 2.7 | 2.9 | 3.6 | 4.4 | 6.3 |
| | | $+60/+80$ | 4.3 | 4.6 | 5.4 | 6.3 | 8.3 | 3.2 | 3.5 | 4.2 | 5.0 | 7.0 |

---

$n_d = 1.62014$  $v_d = 63.52$  $n_F - n_C = 0.009763$
$n_e = 1.62247$  $v_e = 63.23$  $n_F - n_{C'} = 0.009845$

| Refractive Indices | | | Relative Partial Dispersion | | Internal Transmittance $T_i$ | | |
|---|---|---|---|---|---|---|---|
| | $\lambda[nm]$ | | $P_{s,t}$ | 0.2795 | $\lambda[nm]$ | $T_i(5 mm)$ | $T_i(25 mm)$ |
| $n_{2325.4}$ | 2325.4 | | $P_{C,s}$ | 0.5377 | 2325.4 | 0.94 | |

-continued

| | | | | | | | | |
|---|---|---|---|---|---|---|---|---|
| $n_{1970.1}$ | 1970.1 | | $P_{d,C}$ | 0.3044 | 1970.1 | 0.970 | | |
| $n_{1529.6}$ | 1529.6 | | $P_{e,d}$ | 0.2386 | 1529.6 | 0.985 | | |
| $n_{1060.0}$ | 1060.0 | 160.854 | $P_{g,F}$ | 0.5419 | 1060.0 | 0.995 | | |
| $n_t$ | 1014.0 | 1.60919 | $P_{i,h}$ | 0.7644 | 700 | 0.997 | 0.983 | |
| $n_s$ | 852.1 | 1.61192 | | | 660 | 0.997 | 0.984 | |
| $n_r$ | 706.5 | 1.61548 | $P'_{s,t}$ | 0.2772 | 620 | 0.997 | 0.985 | |
| $n_C$ | 656.3 | 1.61717 | $P'_{C,s}$ | 0.5813 | 580 | 0.997 | 0.986 | |
| $n_{C'}$ | 643.8 | 1.61764 | $P'_{d,C}$ | 0.2538 | 546.1 | 0.997 | 0.986 | |
| $n_{632.8}$ | 632.8 | 1.61808 | $P'_{e,d}$ | 0.2366 | 500 | 0.996 | 0.981 | |
| $n_D$ | 589.3 | 1.62005 | $P'_{g,F}$ | 0.4811 | 460 | 0.993 | 0.965 | |
| $n_d$ | 587.6 | 1.62014 | $P'_{i,h}$ | 0.7580 | 435.8 | 0.988 | 0.94 | |
| $n_e$ | 546.1 | 1.62247 | | | 420 | 0.983 | 0.92 | |
| $n_F$ | 486.1 | 1.62693 | Other Properties | | 404.7 | 0.973 | 0.87 | |
| $n_{F'}$ | 480.0 | 1.62749 | $\alpha_{-30/+70°C}$ [$10^{-6}$/K] | 9.4 | 400 | 0.960 | 0.81 | |
| $n_g$ | 435.8 | 1.63222 | $\alpha_{20/300°C}$ [$10^{-6}$/K] | 10.7 | 390 | 0.93 | 0.69 | |
| $n_h$ | 404.7 | 1.63660 | $T_g$ [°C] | 614 | 380 | 0.88 | 0.52 | |
| $n_i$ | 365.0 | 1.64407 | $T_{10}7.6$ [°C] | 701 | 370 | 0.82 | 0.37 | |
| | | | $C_p$[J/g · K] | 0.603 | 365.0 | 0.78 | 0.28 | |
| | | | $\lambda$[W/m · K] | 0.612 | 350 | 0.57 | 0.06 | |
| | | | | | 334.1 | 0.26 | | |
| | | | $\rho$[g/cm$^3$] | 3.60 | 320 | 0.05 | | |
| Constants of Dispersion Formula | | | E [$10^3$ N/mm$^2$] | 77 | 310 | 0.02 | | |
| $A_0$ | 2.5852417 | | $\mu$ | 0.287 | 300 | | | |
| $A_1$ | $-9.4290947 \cdot 10^{-3}$ | | HK | 370 | 290 | | | |
| $A_2$ | $1.4074470 \cdot 10^{-2}$ | | | | 280 | | | |
| $A_3$ | $2.7924791 \cdot 10^{-4}$ | | B | 1 | | | | |
| $A_4$ | $-1.2779218 \cdot 10^{-5}$ | | CR | 2 | | | Remarks | |
| $A_5$ | $9.4769182 \cdot 10^{-7}$ | | FR | 1 | | "O" | | |
| | | | SR | 52 | | | | |
| | | | AR | 1.0 | | | | |

| Deviation of Relative Partial Dispersions Δ P from the "Normal Line" | | Temperature Coefficients of Refractive Index | | | | | | | | | |
|---|---|---|---|---|---|---|---|---|---|---|---|
| | | $\Delta n/\Delta T_{relative}$[$10^{-6}$/K] | | | | | $\Delta n/\Delta T_{absolute}$[$10^{-6}$/K] | | | | |
| $\Delta P_{C,t}$ | $-0.0290$ | [°C] | 1060.0 | s | C' | e | g | 1060.0 | s | C' | e | g |
| $\Delta P_{C,s}$ | $-0.0132$ | $-40/-20$ | | | | | | | | | | |
| $\Delta O_{F,e}$ | 0.0020 | $-20/0$ | $-2.8$ | $-2.7$ | $-2.5$ | $-2.4$ | $-1.8$ | $-4.7$ | $-4.6$ | $-4.4$ | $-4.3$ | $-3.7$ |
| $\Delta P_{g,F}$ | 0.0050 | $0/+20$ | $-2.6$ | $-2.6$ | $-2.4$ | $-2.2$ | $-1.7$ | $-4.2$ | $-4.1$ | $-4.0$ | $-3.8$ | $-3.4$ |
| $\Delta P_{i,g}$ | 0.0217 | $+20/+40$ | $-2.6$ | $-2.5$ | $-2.3$ | $-2.1$ | $-1.5$ | $-4.0$ | $-3.9$ | $-3.7$ | $-3.5$ | $-2.9$ |
| | | $+40/+60$ | $-2.6$ | $-2.5$ | $-2.3$ | $-2.1$ | $-1.5$ | $-3.7$ | $-3.7$ | $-3.5$ | $-3.3$ | $-2.8$ |
| | | $+60/+80$ | $-2.5$ | $-2.4$ | $-2.2$ | $-2.0$ | $-1.4$ | $-3.6$ | $-3.5$ | $-3.3$ | $-3.1$ | $-2.5$ |

What is claimed is:

1. A reconnaissance system, for mounting in an aircraft, comprising:
    a wide-angle lens positioned to image ground-level surface onto a fixed focal plane; and
    an electro-optic imager having a substantially one-dimensional imaging area, and movable within the focal plane defined by said lens and having its long dimension oriented substantially normal to the vector within the image of the ground-level surface which corresponds to the flight track of the aircraft; and
    one or more mechanical linkages which move said imager within said focal plane to point to a desired strip which is either forward or aft of the nadir of the aircraft.

2. The system of claim 1, wherein a first element of said lens is reduced in size in one dimension, to reduce its field of view in the fore-aft direction.

3. The system of claim 1, wherein a first element of said lens is slabbed in one dimension.

4. The system of claim 1, wherein said lens is substantially apochromatic.

5. The system of claim 1, wherein said lens has a field of view which is more than 135 degrees wide in at least one direction.

6. The system of claim 1, wherein said lens is fixedly mounted.

7. The system of claim wherein said imager comprises a charge-coupled device.

8. The system of claim 1, wherein said imager comprises a linear charge-coupled device.

9. The system of claim 1, wherein said imager comprises two linear imagers butted together, said linear imagers having respective imaging areas which are substantially abutted at respective extremities thereof.

10. The system of claim 1, wherein said imager comprises a quasilinear charge-coupled device.

11. The system of claim 1, wherein said lens has a field of view greater than 120°, and wherein the calibrated pincushion distortion of said lens at 60° off-axis is much less than 3%.

12. The system of claim 1, wherein said lens has a field of view greater than 120°, and wherein said lens images equal areas onto substantially equal areas.

13. The system of claim 1, wherein said imager sees a field of view greater than 120°, and wherein the maximum calibrated linear distortion across the width of said imager is less than 10%.

14. The system of claim 1, wherein outputs of said imager are pixel-shifted to compensate for image motion components parallel to the long dimension of said imager.

15. The system of claim 1, wherein a transparent cover is hermetically sealed in a fixed relationship to said imager, and said cover moves with said imager.

16. The system of claim 1, wherein said imager is mounted to a thermoelectric cooler, and said cooler moves with said imager.

17. An imaging system for producing an image with substantially high resolution and low distortion throughout, the imaging system comprising:

(a) a wide-angle lens positioned substantially fixedly, the lens imaging equal areas onto substantially equal areas;
(b) an electro-optic imager having an imaging area which is elongated in one dimension; and
(c) one or more mechanical linkages which controllably move said imager
  (1) within the focal plane defined by said lens,
  (2) in a direction substantially normal to the long dimension of said imager,
  (3) to image a desired portion of the field of view of said lens which can selectably be either
    (i) entirely on one side of the center of the field of view of said lens, or
    (ii) entirely on the other side of the center of the field of view of said lens,
wherein the electro-optic imager contributes to the formation of the image having substantially high resolution and low distortion throughout.

18. The system of claim 17, wherein a first element of said lens is reduced in size in one dimension, to reduce its field of view in the fore-aft direction.

19. The system of claim 17, wherein a first element of said lens is slabbed in one dimension.

20. The system of claim 17, wherein said lens is substantially apochromatic.

21. The system of claim 17, wherein said lens has a field of view which is more than 135 degrees wide in at least one direction.

22. The system of claim 17, wherein said lens is fixedly mounted.

23. The system of claim 17, wherein said imager comprises a linear charge-coupled device.

24. The system of claim 17, wherein said imager comprises two linear imagers butted together, said linear imagers having respective imaging areas which are substantially abutted at respective extremities thereof.

25. The system of claim 17, wherein said imager comprises a quasi-linear charge-coupled device.

26. The system of claim 17, wherein said imager sees a field of view greater than 120°, and wherein the maximum calibrated linear distortion of said lens across the width of said imager is less than 10%.

27. The system of claim 17, wherein outputs of said imager are pixel-shifted to compensate for image motion components parallel to the long dimension of said imager.

28. The system of claim 17, wherein a transparent cover is hermetically sealed in a fixed relationship to said imager, and said cover moves with said imager.

29. The system of claim 17, wherein said imager comprises a charge-coupled device.

30. The system of claim 17, wherein said imager is mounted to a thermoelectric cooler, and said cooler moves with said imager.

31. The system of claim 17, wherein said lens is positioned substantially fixedly to look through an external window.

32. A reconnaissance system, for mounting in an aerial platform, comprising:
  a wide-angle lens positioned substantially fixedly;
  an electro-optic imager having an imaging area which is elongated in one dimension; and
  one or more mechanical linkages which controllably move said imager
    within the focal plane defined by said lens,
    in a direction substantially normal to the long dimension of said imager,
    to image a desired portion of the field of view of said lens which can selectably be either entirely on one side of the center of the field of view of said lens or entirely on the other side of the center of the field of view of said lens.

33. The system of claim 32, wherein said lens is fixedly mounted.

34. The system of claim 32, wherein outputs of said imager are pixel-shifted to compensate for image motion components parallel to the long dimension of said imager.

35. The system of claim 32, wherein said lens is substantially apochromatic.

36. The system of claim 32, wherein said imager comprises a charge-coupled device.

37. The system of claim 32, wherein said imager comprises two linear imagers butted together, said linear imagers having respective imaging areas which are substantially abutted at respective extremities thereof.

38. The system of claim 32, wherein said imager comprises a quasi-linear charge-coupled device.

39. The system of claim 32, wherein said lens has a field of view greater than 120°, and wherein the calibrated pincushion distortion of said lens at 60° off-axis is much less than 3%.

40. The system of claim 32, wherein said lens has a field of view greater than 120°, and wherein said lens images equal areas onto substantially equal areas.

41. The system of claim 32, wherein said imager sees a field of view greater than 120°, and wherein the maximum calibrated linear distortion across the width of said imager is less than 10%.

42. The system of claim 32, wherein said lens has a field of view which is more than 135 degrees wide in at least one direction.

43. The system of claim 32, wherein a transparent cover is hermetically sealed in a fixed relationship to said imager, and said cover moves with said imager.

44. The system of claim 32, wherein said imager is mounted to a thermoelectric cooler, and said cooler moves with said imager.

45. The system of claim 32, wherein a first element of said lens is reduced in size in one dimension, to reduce its field of view in the fore-aft direction.

46. The system of claim 32, wherein said imager comprises a charge-coupled device having a substantially linear imaging area.

47. The system of claim 32, wherein said lens is positioned substantially fixedly to look through an external window.

48. The system of claim 32, wherein
  said imager comprises two linear imagers butted together,
  said linear imagers having respective imaging areas which are substantially abutted at respective extremities thereof,
  and pixel values are regenerated for locations falling between said respective extremities, where no respective imaging areas exist.

49. The system of claim 32, wherein said desired portion of the field of view of said lens can be either before or behind the nadir of said aerial platform.

50. A method for providing images of a ground-mounted object using high-speed low-level overflight, comprising the steps of:
  flying an air vehicle near the ground-mounted object, wherein said air vehicle includes a wide-angle lens mounted to image ground-level objects onto a substantially fixed focal plane, and includes an electro-optic imager, having a substantially one-dimensional imaging area, movably mounted within the focal plane defined by said lens, said imager having its long dimension oriented normal to the vector within the image of the ground-level surface which corresponds to the flight track of the aircraft;

moving said imager within said focal plane, normal to the principal axis of said imaging area thereof, until the strip of ground imaged onto said imager is at a viewing angle, with reference to said air vehicle, which is substantially optimal for image understanding under the actual and expected environmental conditions and features to be recognized;

and outputting image data from said imager.

51. The method of claim 50, wherein outputs of said imager are pixel-shifted to compensate for image motion components parallel to the long dimension of said imager.

52. The method of claim 50, wherein said lens is substantially apochromatic.

53. The method of claim 50, wherein said lens has a field of view which is more than 135 degrees wide in at least one direction.

54. The method of claim 50, wherein said lens is fixedly mounted.

55. The method of claim 50, wherein said imager comprises a charge-coupled device.

56. The method of claim 50, wherein said imager comprises a quasi-linear charge-coupled device.

57. The method of claim 50, wherein said lens has a field of view greater than 120°, and wherein the calibrated pincushion distortion of said lens at 60° off-axis is much less than 3%.

58. The method of claim 50, wherein said lens has a field of view greater than 120°, and wherein said lens images equal areas onto substantially equal areas.

59. The method of claim 50, wherein a transparent cover is hermetically sealed in a fixed relationship to said imager, and said cover moves with said imager.

60. The method of claim 50, wherein said imager is mounted to a thermoelectric cooler, and said cooler moves with said imager.

61. The method of claim 50, wherein said lens is positioned substantially fixedly to look through an external window.

62. The method of claim 50, wherein
said imager comprises two linear imagers butted together,
said linear imagers having respective imaging areas which are substantially abutted at respective extremities thereof,
and pixel values are regenerated for locations falling between said respective extremities, where no respective imaging areas exist.

63. A method for providing images of a ground-mounted object using high-speed low-level overflight, comprising the steps of:
flying an air vehicle near the ground-mounted object, wherein said air vehicle includes a wide-angle lens mounted to image ground-level objects onto a substantially fixed focal plane, and includes an electro-optic imager, having a substantially one-dimensional imaging area, movably mounted within the focal plane defined by said lens, said imager having its long dimension oriented normal to the vector within the image of the ground-level surface which corresponds to the flight track of the aircraft;
moving said imager within said focal plane, normal to the principal axis of said imaging area thereof, in the same direction as the apparent image motion on said focal plane;
and outputting image data from said imager.

64. The method of claim 63, wherein a first element of said lens is reduced in size in one dimension, to reduce its field of view in the fore-aft direction.

65. The method of claim 63, wherein said lens is substantially apochromatic.

66. The method of claim 63, wherein said lens has a field of view which is more than 135 degrees wide in at least one direction.

67. The method of claim 63, wherein said lens is fixedly mounted.

68. The method of claim 63, wherein said imager comprises a charge-coupled device.

69. The method of claim 63, wherein said imager comprises a linear charge-coupled device.

70. The method of claim 63, wherein said imager comprises a quasi-linear charge-coupled device.

71. The method of claim 63, wherein said lens has a field of view greater than 120°, and wherein said lens images equal areas onto substantially equal areas.

72. The method of claim 63, wherein said imager sees a field of view greater than 120°, and wherein the maximum calibrated linear distortion across the width of said imager is less than 10%.

73. The method of claim 63, wherein outputs of said imager are pixel-shifted to compensate for image motion components parallel to the long dimension of said imager.

74. The method of claim 63, wherein said imager is mounted to a thermoelectric cooler, and said cooler moves with said imager.

75. The method of claim 63, wherein said lens is positioned substantially fixedly to look through an external window.

76. The method of claim 64, wherein
said imager comprises two linear imagers butted together,
said linear imagers having respective imaging areas which are substantially abutted at respective extremities thereof,
and pixel values are regenerated for locations falling between said respective extremities, where no respective imaging areas exist.

77. A method for providing images of a ground-mounted object using high-speed low-level overflight, comprising the steps of:
flying an air vehicle near the ground-mounted obJect, wherein said air vehicle includes a wide-angle lens mounted to image ground-level objects onto a substantially fixed focal plane, and includes an electro-optic imager, having a substantially one-dimensional imaging area, movably mounted within the focal plane defined by said lens, said imager having its long dimension oriented normal to the vector within the image of the ground-level surface which corresponds to the flight track of the aircraft;
moving said imager within said focal plane, normal to the principal axis of said imaging area thereof, in a direction opposite to the apparent image motion on said focal plane;
and outputting image data from said imager.

78. The method of claim 77, wherein a first element of said lens is reduced in size in one dimension, to reduce its field of view in the fore-aft direction.

79. The method of claim 77, wherein said lens has a field of view which is more than 135 degrees wide in at least one direction.

80. The method of claim 77, wherein said lens is fixedly mounted.

81. The method of claim 77, wherein said imager comprises a charge-coupled device.

82. The method of claim 77, wherein said imager comprises two imaging areas which are substantially abutted at respective extremities thereof.

83. The method of claim 77, wherein said lens has a field of view greater than 120°, and wherein the calibrated pincushion distortion of said lens at 60° off-axis is much less than 3%.

84. The method of claim 77, wherein said lens has a field of view greater than 120°, and wherein said lens images equal areas onto substantially equal areas.

85. The method of claim 77, wherein said imager sees a field of view greater than 120°, and wherein the maximum calibrated linear distortion across the width of said imager is less than 10%.

86. The method of claim 77, wherein said lens is positioned substantially fixedly to look through an external window.

87. The method of claim 77, wherein the air vehicle is operated in a terrain-following mode, and wherein said imager is moved opposite to the apparent image motion within the focal plane at a time when the air vehicle is making a pop-up.

88. A method for providing three-dimensional images of a ground-mounted object, comprising the steps of:
flying an air vehicle near the ground-mounted object, wherein said air vehicle includes a wide-angle lens mounted to image ground-level obJects onto a substantially fixed focal plane, and includes an electro-optic imager, having a substantially one-dimensional imaging area, movably mounted within the focal plane defined by said lens, said imager having its long dimension oriented normal to the vector within the image of the ground-level surface which corresponds to the flight track of the aircraft;
moving said imager within said focal plane to image the ground-mounted object at a first relative position while the object is ahead of said aircraft;
and moving said imager within said focal plane to image the ground-mounted object at a second relative position while the object is less far ahead of said aircraft;
and deriving three-dimensional information regarding the object from correlation of data provided by said imager at said first position and at said second position.

89. The method of claim 88, wherein said lens has a field of view which is more than 135 degrees wide in at least one direction.

90. The method of claim 88, wherein said lens is fixedly mounted.

91. The method of claim 88, wherein said imager comprises a substantially linear charge-coupled device.

92. The method of claim 88, wherein said imager comprises two linear imagers butted together, said linear imagers having respective imaging areas which are substantially abutted at respective extremities thereof.

93. The method of claim 88, wherein said lens has a field of view greater than 120°, and wherein the calibrated pincushion distortion of said lens at 60° off-axis is much less than 3%.

94. The method of claim 88, wherein said lens has a field of view greater than 120°, and wherein said lens images equal areas onto substantially equal areas.

95. The method of claim 88, wherein said imager sees a field of greater than 120°, and wherein the maximum calibrated linear distortion across the width of said imager is less than 10%.

96. The method of claim 88, wherein, at said second relative position, the object is behind said aircraft.

* * * * *